(12) United States Patent
Bâcher et al.

(10) Patent No.: US 11,478,931 B2
(45) Date of Patent: Oct. 25, 2022

(54) COMPUTATIONAL VIBRATION SUPPRESSION FOR ROBOTIC SYSTEMS

(71) Applicant: DISNEY ENTERPRISES, INC., Burbank, CA (US)

(72) Inventors: Moritz Niklaus Bâcher, Zurich (CH); Shayan Hoshyari, Vancouver (CA); Hongyi Xu, Munich (DE); Stelian Coros, Zurich (CH); Lars Espen Knoop, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 438 days.

(21) Appl. No.: 16/451,209

(22) Filed: Jun. 25, 2019

(65) Prior Publication Data
US 2020/0406461 A1 Dec. 31, 2020

(51) Int. Cl.
*B25J 9/16* (2006.01)

(52) U.S. Cl.
CPC .................. *B25J 9/1671* (2013.01)

(58) Field of Classification Search
CPC . B25J 9/16; B25J 9/1656; B25J 9/1671; B25J 9/1633; B25J 9/163; B25J 9/1669; G05B 19/4069; G05B 19/41885; G05B 2219/39; G05B 2219/39195; G05B 2219/40; G05B 2219/40264
USPC ........................................................ 700/254
See application file for complete search history.

(56) References Cited

U.S. PATENT DOCUMENTS

| 10,960,549 | B2* | 3/2021 | Inagaki | B25J 13/088 |
| 2012/0055990 | A1* | 3/2012 | Weiss | F42B 12/70 |
| | | | | 235/412 |
| 2016/0221189 | A1* | 8/2016 | Nilsson | B25J 9/1653 |
| 2020/0338724 | A1* | 10/2020 | Hayashi | B25J 9/163 |

FOREIGN PATENT DOCUMENTS

CN 107433589 A * 12/2017 ............. B25J 19/00

OTHER PUBLICATIONS

Zhao Liu, Rigid-Flexible Coupling Simulation and Vibration Analysis of Flexible Robot, 2017, IEEE (Year: 2017).*

\* cited by examiner

*Primary Examiner* — Khoi H Tran
*Assistant Examiner* — Sarah A Tran
(74) *Attorney, Agent, or Firm* — Snell & Wilmer L.L.P.; Kent A. Lembke

(57) ABSTRACT

A robot control method, and associated robot controllers and robots operating with such methods and controllers, providing computational vibration suppression. Given a desired animation cycle for a robotic system or robot, the control method uses a dynamic simulation of the physical robot, which takes into account the flexible components of the robot, to predict if vibrations will be seen in the physical robot. If vibrations are predicted with the input animation cycle, the control method optimizes the set of motor trajectories to return a set of trajectories that are as close as possible to the artistic or original intent of the provider of the animation cycle, while minimizing unwanted vibration. The new control method or design tool suppresses unwanted vibrations and allows a robot designer to use lighter and/or softer (less stiff) and, therefore, less expensive systems in new robots.

24 Claims, 13 Drawing Sheets

COMPUTATIONAL VIBRATION SUPPRESSION FOR ROBOTIC SYSTEMS

BACKGROUND

1. Field of the Description

The present description relates, in general, to robots (or "robotic systems" or "robotic characters") and control systems and methods for such robots. More particularly, the description relates to a method of generating control signals for a robotic system or robot (and to controllers implementing such a method and robotic systems or robots with such controllers) that provides computational vibration suppression during the movements of the robotic system or robot.

2. Relevant Background

Audio-animatronic figures and other robotic systems often suffer from unwanted vibrations during their operations. In particular, robotic systems or robots often will experience undesirable vibrations when undergoing fast and dynamic motions such as may be useful in a robotic character to provide expressive animations. For example, a robot may have an arm or leg that they move quickly from one location to a second location to provide a desired movement or move to a new pose, and the robot's arm or leg may vibrate significantly upon stopping at the second location. This can be undesirable when trying to replicate a particular character's movements, when trying to provide human-like motions, and so on.

In general, robotic systems are designed to be as stiff as possible, but, unfortunately, the physical system is rarely sufficiently stiff to behave like an idealized mechanical system whose components are assumed to be perfectly rigid. Hence, in real, implemented robotic systems, the unwanted vibrations will arise from compliance and deformation in both the joints and the components of the robotic system. This makes the task of animating the physical system a very challenging and tedious endeavor. In an ideal design world, the robot designers could rig a robotic character, have a skilled animator provide realistic, plausible, and natural-looking animations cycles, and then replay these animations directly on the physical system (i.e., the robot whose control is being designed). In reality, though, these animations may often lead to unwanted vibrations, which forces the designer to manually tune the motion trajectories (e.g., slow the movements down) while running experiments on the physical robot in order to try to avoid the vibrations.

Hence, there remains a need for a new method of generating control signals (and a new robot controller implementing such methods and robots/robotic systems with such controllers) to control operations of a robotic system so as to reduce (or even eliminate in some cases) unwanted vibrations of the robotic system components such as during rapid movements.

SUMMARY

With the above vibration issues in mind, a robot control method (and associated robot controllers and robots operating with such methods and controllers) is described herein that provides computational vibration suppression. In some embodiments, the techniques described herein are performed offline in a design stage for a controller defining control signals (or trajectories set by such control signals). Given a desired animation cycle for a robotic system or robot, the control method (or its vibration suppression routine or controller module) uses a dynamic simulation of the physical robot. This simulation, which takes into account the flexible components of the robot, is adapted to predict if vibrations will be seen in the physical robot or robotic system. If vibrations are predicted to be present with the input animation cycle, the control method optimizes the set of motor trajectories to return a set of trajectories that are as close as possible to the artistic or original intent of the provider of the animation cycle, while minimizing unwanted vibration. Designing for stiffness leads to robotic systems that tend to be heavy, which requires strong and expensive motors to drive them. In contrast, the new control method/design tool that suppresses unwanted vibrations allows a robot designer to use lighter and/or softer (less stiff) and, therefore, less expensive systems in new robots. In other words, the new design/control method shifts design complexity toward computation.

The computational framework developed by the inventors takes as input animations (e.g., artist-specification of an animation that defines time-varying angles for motors or the like). The computational framework changes the animations, e.g., the time-varying motor angles, to minimize (or at least reduce) the difference between simulated and target trajectories of a set of user-selected (or controller selected) points (or "marker points" or "target points"), as shown in FIG. 2 with marker points 250 and 254, on mechanical components such as the hands, feet, and/or joints of a robotic system. To be able to predict vibrations, the components of the robot are modeled as flexible bodies, such as by discretizing them with finite elements, and the dynamic behavior of the flexible bodies are then simulated while replaying target animations. The flexible bodies are coupled to rigid bodies at either end and then simulated as part of a multibody dynamics formulation. To estimate damping and stiffness parameters of components, motion-tracking markers are placed on the physical system, and parameters are tuned to make the simulations closely match the behavior of the physical systems.

The inventors recognized that the state of a dynamical system at a particular timestep is dependent on the states of all previous timesteps. Hence, to compare simulated trajectories to target trajectories, a full animation cycle should be simulated to be able to compare the performance to creative targets. To reduce time complexity in simulations, a reduced model may be used for FEM simulations of components. To computationally suppress vibrations, the difference between simulated and target trajectories is compared for a set of user-selected (or controller selected) points on the robotic system. Then, taking the entire motion trajectory into account, the motion profiles of the motors (time varying angles or the like) is optimized to reduce the visible vibrations.

The approach taught herein for a new robotic controller (or design of control signals for a robotic system) was tested on very soft (lower stiffness) systems of increasing complexity. While smaller in size than many animatronic devices, thin rod-like components in experimental setups were useful in generating very soft robotic systems that can be translated into design of larger robots. The testing showed, that the new computational technique is very effective in suppressing vibrations while staying close to the input trajectories (e.g., artist-provided animations defining trajectories).

More particularly, a system is provided for suppressing vibration in a robotic system. The system includes memory (e.g., any useful data storage device) storing a definition of a robot defining a plurality of components of the robot and storing an input animation for the robot defining motion of the components of the robot over a time period. The system also includes a processor (which may include one or more processing devices) communicatively linked to the memory (in a wired or wireless manner allowing communication of digital data). The system further includes a simulator provided by the processor running software (or executing code or instructions in onboard RAM or the like). During operations of the system, the simulator performs a dynamic simulation of the robot performing the input animation including modeling a first set of the components as flexible components (or bodies) and a second set of the components as rigid components (or bodies). Each of the flexible components is coupled at opposite ends to one of the rigid components, and the dynamic simulation predicts vibrations for the robot in performing the defined motion. The system further includes an optimizer provided by the processor running software (e.g., executing instructions or code in RAM or the like). The optimizer generates a retargeted motion for the components by adjusting the defined motion to suppress a portion of the vibrations.

In some embodiments of the system, the portion of the vibrations that is suppressed is low-frequency, large-amplitude vibrations of one or more of the components of the robot. In these and other embodiments, the ends of the flexible components are coupled to the rigid components using constraint-based, two-way coupling. Further, the input animation may include a set of motor trajectories, and, in such cases, the optimizer modifies the set of motor trajectories to generate the retargeted motion for the components. Additionally, the memory may store a set of user-selected points on the components of the robot, and the optimizer may modify the set of motor trajectories to retain trajectories of the user-selected points from the defined motion in the retargeted motion. In some cases, the set of user-selected points are on end effectors or rigid bodies of the robot.

In some preferred implementations of the system, the optimizer generates the retargeted motion by minimizing differences between locations of a set of tracked marker points attached to rigid bodies in the components of the robot in the defined motion and in the retargeted motion and by allowing vibrations in one or more of the components disposed between the set of rigid bodies. In such implementations, the minimization of differences is adapted to allow some amount of overshooting of target locations of the set of tracked marker points to reduce global error regarding relative positioning of the set of tracked marker points during the retargeted motion, by minimizing the error integrated over time.

In some cases, the components of the robot include tracked marker points, and the generating of the retargeted motion comprises retaining orientations of the tracked marker points in orientations in the defined motion of the input animation. In these and other cases, the generating of the retargeted motion includes retaining relative positions in global coordinates of pairs of neighboring ones of the rigid components. If the global coordinates of rigid bodies adjacent to a deformable body are tracked, the accumulation of vibrations in deformable components can be controlled. Additionally, the system may include a robot controller including the processor, and the robot controller is adapted to generate a set of control signals for a physical implementation of the robot (e.g., to control the physical robot) based on the retargeted motion generated by the optimizer.

DETAILED DESCRIPTION

Figure 1:
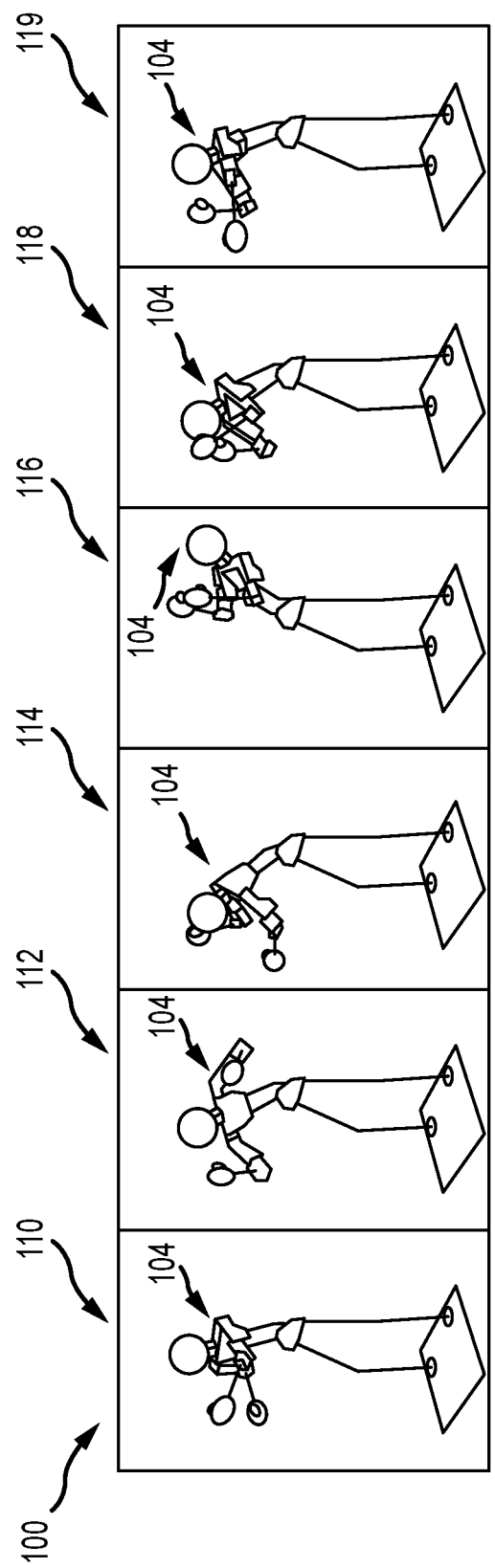
FIG. 1 illustrates sequence of robotic motions/movements carried out by a robot/robotic system using retargeted animations and/or optimized motor trajectories generated by a computational method of the present description to suppress unwanted vibrations.

Briefly, a method is described for generating vibration-minimizing motion or animation for robotic systems (or robots or robotic characters, herein). The retargeted motion generated from an input or target animation (or set of time-varying angles for motors or trajectories) may be created offline as a part of a controller design process and/or online by the controller using the techniques herein. The following discussion will begin with a brief overview of the new motion retargeting process and introduction to the design problem, and this will then be followed by a detailed discussion of specific implementations and testing in design of robotic characters.

Creating animations for robotic characters is very challenging due to the constraints imposed by their physical nature. In particular, the combination of fast motions and unavoidable structural deformations leads to mechanical oscillations that negatively affect their performances. One goal of the inventors is to automatically transfer motions created using traditional animation software to physical robotic characters while avoiding such artifacts. To this end, the inventors developed an optimization-based, dynamics-aware motion retargeting method and system that adjusts an input motion such that visually salient low-frequency, large-amplitude vibrations are suppressed. A technical core of the new method and system (which may be labeled an animation system/method) includes a differentiable dynamics simulator that provides constraint-based, two-way coupling between rigid and flexible components. The efficacy of the new method was demonstrated through experiments performed on a total of five robotic characters including a child-sized animatronic figure that featured highly dynamic drumming and boxing motions.

As background to the new system/method, it should be understood that ever since Leonardo da Vinci's times, children and adults alike have been fascinated by mechanical systems that are designed to generate natural movements. Over the centuries, da Vinci's first automatons—the Mechanical Lion and the Knight—have evolved into lifelike animatronic figures that are routinely deployed in museums, theme parks, and movie studios across the world. Today, in part due to the advent of affordable, easy-to-use digital fabrication technologies and electromechanical components, the process of creating compelling robotic characters is easily accessible to anyone.

Keyframing techniques are commonly used to breathe life into animatronic characters. While these techniques are conceptually identical to those employed in computer animation, creating vibrant motions for real-world characters introduces unique challenges. These challenges stem from the physical characteristics of an animatronic figure's (or robotic system's) design. It is easy, for example, to design virtual characters that have as many degrees of freedom as needed. The design of their robotic counterparts, on the other hand, involves balancing motion versatility against the constraints imposed by the size, weight, and placement of its mechanical components. Furthermore, the motions of real-world characters are strictly bound to the laws of physics. While the idealized limbs of a virtual character are perfectly rigid, for example, structural deformations are unavoidable in physical systems. Unfortunately, the combination of dynamic motions, weighty components, and structural deformations leads to large-scale vibrations during robot movements matching those of the virtual world character. These mechanical oscillations are due to the cyclic transfer between kinetic and potential deformation energy, and they can negatively impact the robot character's performance of the input/target animations.

To combat vibrations, mechanical structures are typically engineered to be as stiff as possible. While such designs work well in industrial settings, these robots are heavy and bulky such that they are ill-suited for many types of robotic characters. An alternative design is to control the robot so as to slow down the motions that are performed to the point where they approach the quasi-static regime. This, of course, is also undesirable when trying to provide a robot that performs similar to a known character (e.g., repeat motions of a human character from a movie or the like). Animators are, therefore, left (before the present invention) with only one option: endlessly tweaking motions in a painstaking, trial-and-error workflow. A goal of the inventors in creating the new motion (or robotic control) method is to fundamentally rethink this process through a physics-based motion retargeting method that is tailored for physical robots and characters provided by such robots' movements.

A novel approach is described herein for creating compelling motions for real-world characters. The input to the method includes motions that are authored using standard animation software such as Autodesk's Maya. Leveraging a simulation model that balances speed and accuracy, the computational method generates an optimized motion that deviates from the input as little as possible while minimizing displeasing artifacts that arise from structural vibrations. The efficacy of the new method is demonstrated through a variety of lightweight physical robots that generate complex motions. The new method provides at least the following new and useful aspects/steps: (a) dynamics-aware motion retargeting for physical robotic characters; (b) continuous space-time optimization for computationally suppressing structural vibrations; and (c) a general formulation of constrained multibody dynamics with two-way coupling between rigid and elastic components.

Evaluation of these aspects and the new method/system is achieved through lively animations that are retargeted to complex robotic characters. For example, FIG. 1 shows animation 100 of a robotic system or robot 104 having a torso, a head, and wire/rod arms and legs to provide a character in the form of a boxer. FIG. 1 shows the animation (or boxing sequence) 100 that is made up of a series of movements 110, 112, 114, 116, 118, and 119 that provides fast punches, blocks, and dodges by the robot 104 using control signals generated using the retargeted animation (or motor trajectories) output by the new computational method for use by a robot controller (i.e., a controller operating the robot 104). As shown with movements 110-119, the new method retargets fast and dynamic animations onto the physical robotic character 104, where the motor trajectories are optimized in order to suppress unwanted structural vibrations and to match the artistic intent as closely as possible.

As an overview of the computational method, given an animation sequence (e.g., input animation provided by an artist or the like), a goal for the computational method is to retarget the motion onto a physical robotic character while avoiding undesirable vibrations due to system dynamics. The motor angles could be extracted from the input animation sequence and replayed on the physical robot, but this may often lead to substantial unwanted vibrations, e.g., due to unavoidable compliance in the components of the physical robot. This can cause the physical robot to deviate significantly from the target or input animation sequence (e.g., the boxing robot 104 of FIG. 1 may have their gloved hands at the end of the rapidly moving arms swing back and forth in a pendulum manner at the end of each motions 110-119). To address this problem a computational tool is provided that optimizes the motor trajectories in order to suppress vibrations while matching the intended or input animation as closely as possible.

Figure 2:
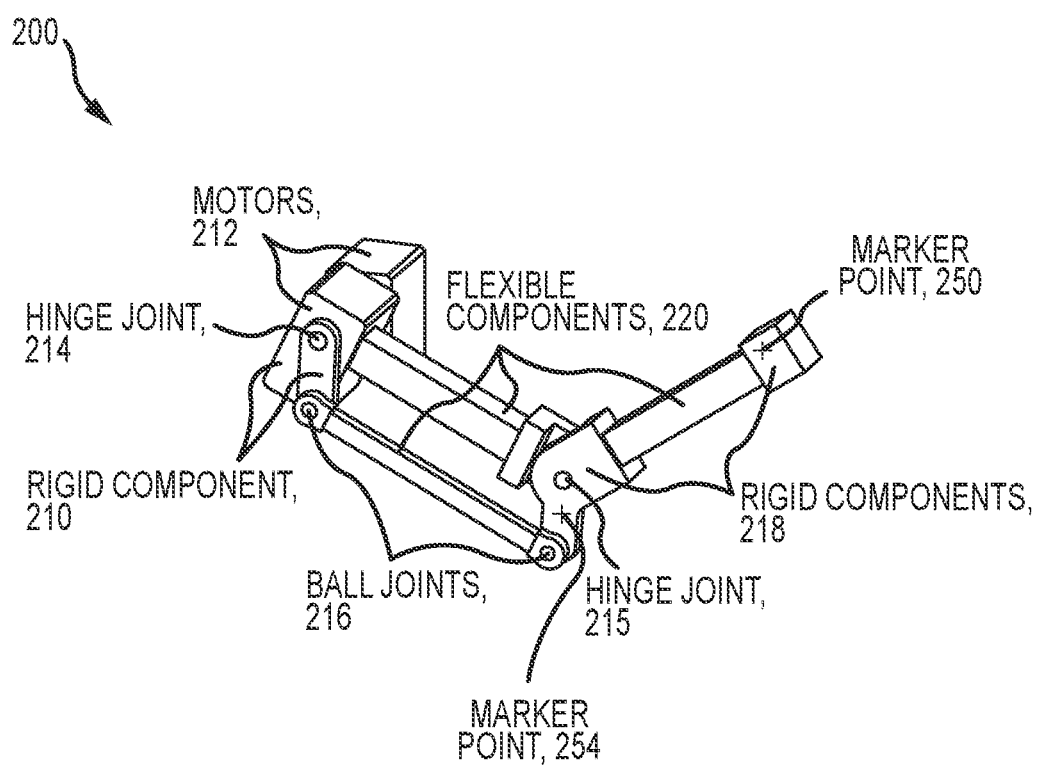
FIG. 2 illustrates a side perspective view of representation of a physical robot with deformable and rigid bodies in place of flexible and stiff parts of a robot's components.

The robotic character, for the computation model, is assumed to be a multi-body system including both rigid components (such as mechanical joints and motors) and flexible bodies that will deform under dynamic motions. FIG. 2 shows a robotic system (or subsystem of a robot or robotic character) 200 that includes rigid components 210 in the form of motors 212, hinge joints 214, 215, ball joints 216, and end members/effectors 216 and flexible components 220 (e.g., elongated links and the like). To simulate the dynamic behavior of robotic characters, flexible parts of components of the robot 200 are represented using deformable bodies and sufficiently stiff parts/components of the robot 200 are represented using rigid bodies. To enforce two-way coupling constraints between deformable and rigid bodies (such as between one of the flexible components 220 and the motors 212 or end members 216), a unified constrained dynamics model is formulated. The computational method can support assemblies with loops and components with a wide range of geometries, mass, and stiffness with the robot 200 being only a simplified example of a useful model of a physical robot (or a portion of such a robot).

As shown with robot 200 of FIG. 2, rigid components are connected to each other using mechanical joints, and flexible bodies are coupled to adjacent rigid components. To physically simulate the dynamics of the system, all sub-systems are time-stepped together in a unified integration scheme, while accurately modeling the two-way coupling effects between subsystems. The deformations on flexible bodies are moderate when observed from the coupled rigid body. By exploiting this, fast and accurate simulation of the robotic characters is achieved via modal reduction techniques.

In the following, the constituent elements of the simulation are first described including elastodynamics, rigid body dynamics, and constraints. Then, a unified integration scheme is presented for dynamics simulation. Next, fast subspace simulation of the robotic characters is presented, with a detailed explanation of how the rigid-body dynamics are integrated in global coordinates while the reduced deformable simulation is solved in the local frame of the coupled rigid body. This is followed by a discussion of using a dynamics simulator to formulate a space-time optimization on motor controls in order to suppress vibrations using a continuous adjoint method. Finally, the description turns to validation of the simulation model by presenting two simple and illustrative examples and to demonstrate the efficacy of the optimization method by retargeting five rich motions to complex physical robotic characters or robots.

With regard to constrained dynamics, to simulate physical robotic characters (as shown with robot 200 of FIG. 2), the inventors use an elastodynamics model to represent flexible parts of the robot's components and rigid bodies to represent parts with a high enough stiffness. The rigid bodies, in turn, are connected to one another with either mechanical joints such as hinges, ball-and-socket connectors, or the like, or with standard rotational motors.

With regard to elastodynamics, the motion of a 3D point $x(X,t)$ on a deformable body, located at the reference location X at time $t_0$, is governed by the equations of motion as follows:

$$\rho \ddot{x}(X,t) - \nabla \cdot P^T(X,t) - \rho g = 0 \qquad \text{Eq. (1)}$$

where the density $\rho$ may vary within the reference domain $\Omega$. Integrated over $\Omega$, the divergence of the transposed first Piola-Kirchhoff stress tensor P results in internal elastic forces that counteract inertia and gravity g (note, g is a 3D vector pointing in the direction of gravity, and its magnitude is the gravitational acceleration).

Spatially discretizing the components with finite elements and interpolating their nodal displacements with quadratic Lagrange shape functions, the standard first-order ODE may be formed as:

$$\dot{u}=v \text{ and } \underline{M}\dot{v}=\underline{f}(u,v) \qquad \text{Eq. (2)}$$

where $u, v \in \mathbb{R}^{3n}$ collect the displacements and velocities of the n nodal degrees of freedom. The forces $f=-f_{damp}-f_{int}+f_{ext}$ combine internal forces $f_{int}$, external forces $f_{ext}$ that are set to gravity, and Rayleigh damping $f_{damp}(u, \dot{u})=(\alpha \underline{M}+\beta K(u))$ with mass matrix $\underline{M}$ and tangent stiffness K. The inventors relied on the Neo-Hookean model for accurate nonlinear stress evaluations since the robotic components undergo large rotations and deformations are moderate even with the relative coordinate formulation (described below). Above, quantities are underlined for which the same standard letters are common in rigid body dynamics (where they overlined).

With regard to rigid body dynamics, to transform points in body to global coordinates, one can characterize states of bodies with their orientation R(t) and position c(t). Columns of rotations R represent a body's frame axes $[r_x, r_y, r_z]$, and the position of its center of mass c is represented by the frame center at time t. The state of a body is governed by the first-order ODE form of the Newton-Euler equations, as:

$$\begin{bmatrix} \dot{c} \\ \dot{q} \end{bmatrix} = \begin{bmatrix} w \\ Q\omega \end{bmatrix} \text{ and } \begin{bmatrix} \overline{M} & \\ & I_c \end{bmatrix} \begin{bmatrix} \dot{w} \\ \dot{\omega} \end{bmatrix} = \begin{bmatrix} \bar{f} \\ \tau_c - [\omega]_x I_c \omega \end{bmatrix} \qquad \text{Eq. (3)}$$

where w is the linear and $\omega$ the angular velocity, $\overline{M}$ the mass, and $I_c = RI_{rb}R^T$ the moment of inertia of the body, with $I_{rb}$ referring to the constant angular mass in body coordinates. To reduce required normalization, the inventor represents rotations with quaternions and use the 4×3-transformation matrix Q(q). The net force $\bar{f}$ acting on the body includes gravity, and, for the sake of brevity, one can absorb the term $[\omega]_x I_c \omega$ in the net torque $\tau_c$ in what follows. $[\omega]_x$ is the matrix form of the cross-product with $\omega$.

With regard to constraints, the inventors include two types of constraints in their dynamic system: (1) mechanical joints that couple rigid bodies pairwise and (2) interfaces between deformable and rigid bodies where degrees of freedom of the finite elements simulation mesh are moving as-rigidly-as-possible with the attached bodies.

As to mechanical joints, to formulate constraints between pairs of rigid bodies, rigid frames are attached to either body, and they are then transformed with their respective orientations and positions. Asking their centers or axes to coincide or remain orthogonal to one another, constraints can be formulated as:

$$C(t,c(t),q(t))=0 \qquad \text{Eq. (4)}$$

that depend on the orientations and positions of the bodies due to these transformations. For motors, the inventors actively changed the relative positions of the two frames so that there was a direct dependence on t.

Figure 3:
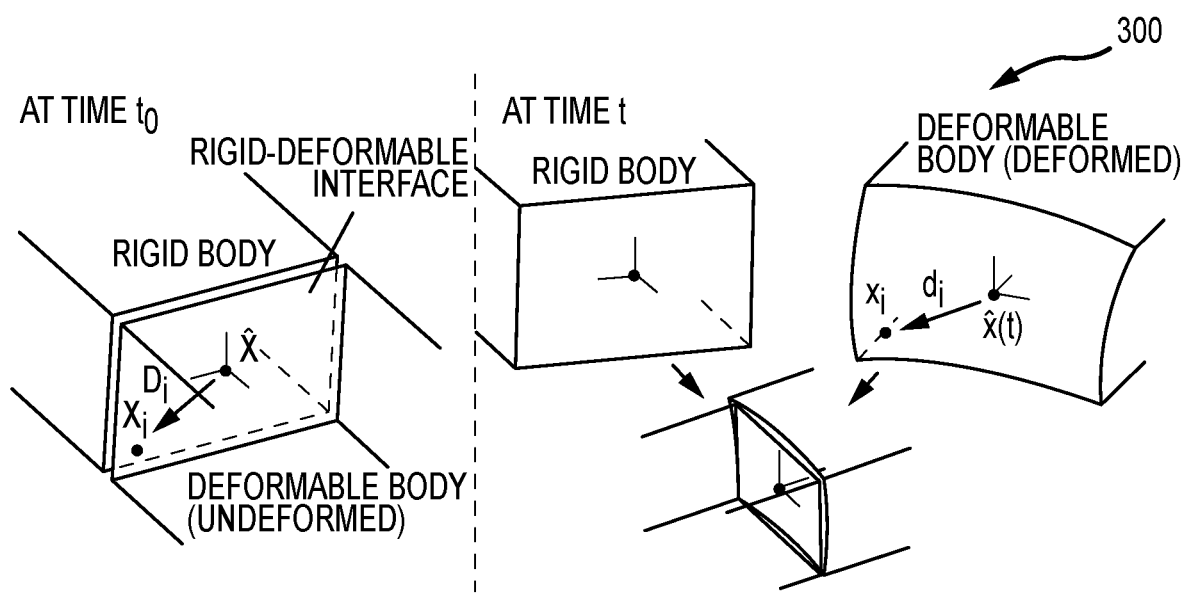
FIG. 3 illustrates a graphic or schematic of the process of coupling deformable to rigid bodies used in the computation method of the present description.

To couple deformable bodies to rigid bodies, a similar mechanism may be used that involves asking frames on either body to coincide in global coordinates. FIG. 3 illustrates with graphic 300 coupling deformable to rigid bodies. A frame on either body can be defined, asking their centers and axes to be equal at time t. To define a center on the rigid body, one can extract the "centroid" $\hat{X}$ of the area-weighted interface nodes $X_i$ at $t_0$, transforming its location to rigid body coordinates. At time t, one can then ask the transformed center to equal the "centroid" of the deformed interface nodes) $\hat{x}(t)$. To extract the rotation between the undeformed and deformed interface, one can compute the transformation that maps vectors $D_i = X_i - \hat{X}$ to their deformed configuration $d_i = x_i - \hat{x}$. Then the orientation of the frame on the rigid body can be set to equal the rotational part of this transformation.

However, because interface nodes on the deformable body do not remain rigid, the formulation of coupling constraints is more involved. The inventors did not assume the input assemblies to be hierarchical. Due to loops in the robotic character assemblies, deformable bodies can be coupled to more than one rigid body (e.g., as in the robotic system 200 of FIG. 2). Moreover, rather than with a penalty method, the inventors enforce coupling in their new computational method with constraints, which constitutes a more physically accurate model besides enabling the stable integration without the necessity of a tedious parameter tuning.

In a first step, the frame centers on either body are extracted that are desired to coincide throughout the motion. To this end, the area-weighted average $\hat{X}$ and $\hat{x}(t)$ of nodes on the interface are computed at rest and time t, respectively. The two "centroids" are then caused to coincide in the local frame of the rigid body with:

$$R(t_0)^T(\hat{X}-c(t_0))-R(t)^T(\hat{x}(t)-c(t))=0 \quad \text{Eq. (5)}$$

To constrain the relative orientations of the two bodies, the optimal linear transformation A(t) is first found that transforms difference vectors $D_i=X_i-\hat{X}$ to their deformed configuration $d_i(t)=x_i(t)-\hat{x}(t)$ by minimizing the sum of squared differences $\Sigma_i \hat{w}_i (AD_i-d_i)^2$, weighted with the normalized interface area incident to node i. Then, the orientations of the interface on the deformable and rigid body are set to coincide with:

$$R(t)R(t_0)^T-(PD(A(t))=0 \quad \text{Eq. (6)}$$

where the polar decomposition (operator PD) is used to extract the rotational part of the transformation A. To minimize the number of constraints, the orthogonality can be enforced between columns of the combined rotation $R(t)R(t_0)^T$ and the axes of the rotational part of A with three dot product constraints. Because the deformed nodes on the interface depend on the displacement, the combined constraints are:

$$C(t,c(t),q(t),u(t))=0 \quad \text{Eq. (7)}$$

and depend on u besides the rigid body locations and orientations.

With regard to enforcing constraints, the computational method includes formed constraint Jacobians $C_c$, $C_q$, and $C_u$ with regards to locations and orientations of rigid bodies and displacements of the deformable bodies. The constraint forces $C_c^T \Lambda$ and $C_u^T \Lambda$ are added to $\bar{f}$ and $\underline{f}$, respectively. $\Lambda$ is a vector of Lagrange multipliers (one per constraint). Note that constraint torques $(C_q Q)^T$ require a transformation with matrix Q before they are added to $\tau_c$. By construction, these generalized forces do not do any work on the system. Hence, they do not add nor remove energy. To form Jacobians of the coupling constraints, the derivatives of the polar decomposition are taken (with derivations of the first and second derivative of operator PD being known in the arts). While only the first derivatives are needed for simulation, second derivatives are used for gradient computations during optimization as discussed below.

To form the system of differential-algebraic equations (DAE) that describe the dynamics of the robotic characters, the inventors combined the deformable and rigid body ODEs (Eqs. (2) and (3)) as follows:

$$\dot{U}-TV=0 \text{ with } T(U)=\text{diag}(E,Q(q),E) \quad \text{Eq. (8)}$$

$$M\dot{V}-F-(C_U T)^T \Lambda=0 \text{ with } M(U)=\text{diag}(\overline{M}, I_c(q), \underline{M}) \quad \text{Eq. (9)}$$

with the algebraic equations C=0 in one unified system. In the above equations, the positions and orientations of the rigid and the displacements of the deformable bodies are collected in a generalized position vector $U=[c\ q\ u]^T$, and corresponding velocities are collected in a generalized velocity vector $V=[w\ \omega\ v]^T$. Transformation matrix T relates velocities to the time derivatives of positions, and mass matrix M relates accelerations to generalized $F(U,V)=[\bar{f}\ \tau_c(c,q,\omega)\ \underline{f}(u,v)]^T$ and constraint forces $(C_U T)^T$. The torque not only depends on the locations but also the orientations and angular velocities because the torques $[\omega]_x I_c \omega$ were considered to be part of $\tau_c$. Matrices E are identities of appropriate but different sizes.

Considering time discretization, it will be understood that a direct time integration of the above DAEs is not possible. This is because the constraints C=0 do not directly depend on velocities such that a discretization with neither an explicit nor an implicit scheme would lead to a solvable system. To enforce the constraints, one can either use the first or second time derivatives $\dot{C}=0$ or $\ddot{C}=0$, respectively. The use of the second time derivative results in a semi-explicit, index-1 DAE that can be discretized and solved with either an explicit or implicit scheme. However, because the components of the robotic system are flexible but very stiff, RK4 is unstable even if one were only to time-step the nonlinear deformable body ODE (see supplemental material at the end of this description). Hence, an explicit scheme is not an option. Instead, the inventors relied on velocity constraints $\dot{C}+\alpha C=0$, $\alpha>0$ where they added Baumgarte stabilization to avoid numerical drift in positions, resulting in the pure, index-2 DAE of:

$$G=\begin{bmatrix} E & \\ & M-(C_U T)^T \end{bmatrix}\begin{bmatrix} \dot{U} \\ \dot{V} \\ \Lambda \end{bmatrix}-\begin{bmatrix} TV \\ F \\ -C_t-C_U TV-\alpha C \end{bmatrix}=0 \quad \text{Eq. (10)}$$

that can only be directly discretized and solved with an implicit scheme. This is because the constraint is independent of the algebraic variables $\Lambda$. Due to the dependence of the motor angle on time t, the partial time derivative of the constraints, $C_t$, is non-zero for constraints that involve motors.

While a BDF discretization of either the semi-implicit, index-1 or the pure, index-2 DAE is stable and would fulfill the inventors' requirements for the computational method, some preferred embodiments may use the index-2 DAE because it avoids second derivatives of the constraints for simulation and third derivatives for gradient computations for the optimization. The latter are tedious to derive and implement due to the polar decompositions in the coupling constraints.

To avoid numerical damping, the nonlinear system of DAEs, $G(t, S(t), \dot{S}(t))=0$, was discretized, with state vector $S=[U\ V\ \Lambda]^T$ and its time derivative $\dot{S}=[\dot{U}\ \dot{V}\ \dot{\Lambda}]^T$, with a BDF-2 scheme as:

$$\begin{bmatrix} \left(\dfrac{U_n-\hat{U}_p}{\Delta \hat{t}}\right)-T(U_n)V_n \\ M(U_n)\left(\dfrac{V_n-\hat{V}_p}{\Delta \hat{t}}\right)-F(U_n,V_n)-[C_U(t_n,U_n)T(U_n)]^T \Lambda_n \\ C_t(t_n,U_n)+C_U(t_n,U_n)T(U_n)V_n+\alpha C(t_n,U_n) \end{bmatrix}=0$$

In the above equations, $S_n=[U_n\ V_n\ \Lambda_n]^T$ is the unknown next state, $\hat{S}_p$ is set to the combination of the two previous states—$\frac{4}{3}S_p+\frac{1}{3}S_{p-1}$ that are known, and the time step to $\frac{2}{3}$ of the chosen step size $\Delta t$ (set to $\frac{1}{2000}$ for all the inventors' demonstrations). The system was assumed to be at rest at time $t_0$, setting the initial conditions $S_0$ accordingly (one can use BDF1 for the first timestep). To solve the resulting nonlinear equations for the next state $S_n$, one can use Newton's method where the system is linearized at the current iterate.

Turning now to fast simulation of robotic characters, the new dynamic simulation scheme (as described above) allows accurate simulation of robotic characters when actuating motors according to the artist-specified (input) motion profiles. Nevertheless, simulations are slow for complex characters due to the thousands of deformable DOFs. It becomes even prohibitively expensive as one seeks to optimize the motor profiles. This is because every objective evaluation during line search and every objective gradient evaluation requires a simulation of the entire animation.

To enable fast and accurate simulation of the robotic characters, the inventors relied on established subspace methods. However, the flexible components undergo large rotations, and modal models are poorly suited to represent them. Taking a closer look at the flexible bodies, the inventors observed that their motion is passive, driven by the inertial forces that are due to transformations of coupled rigid bodies. Moreover, their deformations are moderate with regards to the body coordinates of the latter. Inspired by multi-domain reduced simulation, the inventors, therefore, sought to integrate the reduced deformable dynamics in relative coordinates of one of the coupled rigid bodies, time-stepping the rigid body motion in global coordinates.

Before a discussion of the reduced formulation is presented, though, it may be useful to first describe full simulation in relative coordinates. For every deformable body, the adjacent rigid body can be chosen that primarily delivers its motion as reference. As discretized as discussed above, a point $X \in \mathbb{R}^3$ in the reference domain $\Omega$ is mapped to its deformed position $x(X,t) \in \mathbb{R}^3$ via interpolation of the nodal displacements $u \in \mathbb{R}^{3n}$ as:

$$x(X,t)=X+u(X,t)u(X,t)=\Phi(X)u(t) \quad \text{Eq. (11)}$$

where $\Phi \in \mathbb{R}^{3 \times 3n}$ is the concatenation of 3×3 diagonal matrices set to the identity times the quadratic basis function of the corresponding node.

Figure 4:
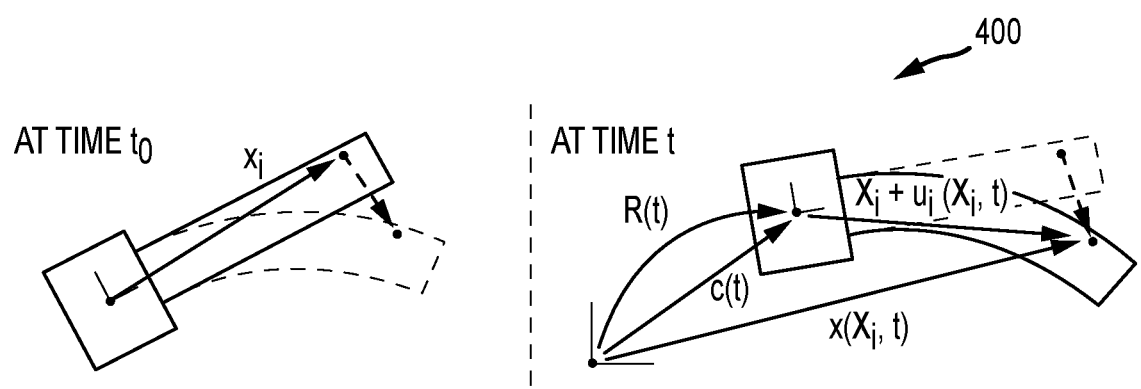
FIG. 4 illustrates a graphic or schematic of relative coordinate formulation used in the computational method to discretize deformable parts of components relative to one of the coupled rigid bodies.

Discretized relative to one of the coupled rigid bodies (as shown in graphic 400 of FIG. 4), the reference point $X_l \in \mathbb{R}^3$ in local coordinates of the coupled body is transformed to its global deformed configuration according to the following $$x(X_l,t)=R(t)[X_l+\Phi_l(X_l)u_l(t)]+c(t) \quad \text{Eq. (12)}$$

with the displacement $u_l$ and the basis $\Phi_l$ defined with regards to the local frame. To increase readability, the subscript l is dropped in the following discussion.

Starting from Eq. (1) and omitting the arguments in the interest of brevity, the weak form of the equations of motion can be formulated as:

$$\int_\Omega \Phi^T R^T (\rho \ddot{x} - \nabla_X \cdot P^T - \rho g) dX = 0 \Rightarrow \int_\Omega \rho \Phi^T R^T \ddot{x} dX = \int_\Omega \Phi^T R^T \nabla \cdot P^T dX + \int_\Omega \rho \Phi^T R^T g dX \quad \text{Eq, (13)}$$

where the equations are transformed to local coordinates of the coupled body by multiplying with $R^T$. The integral on the left represents inertial forces (generalized mass times acceleration), and the two integrals on the right represent internal elastic and external gravitational forces, respectively. Plugging the second time derivative of the deformed configuration in relative coordinates (Eq. (12)) into the integral on the left (see supplemental materials at the end of this description for generalized mass matrices M1-M6 and for a detailed derivation), the inertial forces are formed that correspond to the linear and angular acceleration of the rigid bodies of the robotic systems, and the acceleration of the deformable bodies is provided as:

$$\underline{M_\omega} \dot{\omega} \underline{M_w} \dot{w} \underline{M} \dot{v} \quad \text{Eq. (14)}$$

$$\underline{M_\omega}(q,u) = -(\underline{M1} + \underline{M2}(u)) R^T \underline{M_w}(q) = \underline{M3} R^T \quad \text{Eq. (15)}$$

together with the fictitious centrifugal and Coriolis forces:

$$f_{cen}(q,u,\omega) = \Sigma_j (\omega^T R (\underline{M4}_j + \underline{M5}_j(u)) R^T \omega e_j) - (\underline{M6} + \underline{M}u)(\omega \cdot \omega) \quad \text{Eq. (16)}$$

$$f_{cor}(q,\omega,v) = -2\underline{M2}(v) R^T \omega \quad \text{Eq. (17)}$$

that are due to use of the relative coordinate formulation, with $e_j$ being the j-th column of the identity matrix.

It remains to discuss the first and second integrals on the left. Because the inventors rely on the Green strain (invariant under rigid body motion) and time-step the deformable bodies in their respective relative coordinates, the internal and damping forces for each individual deformable body can be discretized as usual (as discussed above). Because the constant gravity vector g is defined in absolute coordinates, it can be rotated to relative coordinates before integrating the third integral, setting the gravitational forces of the deformable body to $f_{grav}(q) = \underline{M3} R^T g$.

In summary, to time-step deformable bodies in relative coordinates, the deformable body ODE, $M\dot{v} - F = 0$, can be replaced in the simulation DAE (Eq. (8)) with the relative formulation of:

$$\begin{bmatrix} \overline{M} & & \\ & I_c & \\ \underline{M_w} & \underline{M_\omega} & M \end{bmatrix} \begin{bmatrix} \dot{w} \\ \dot{\omega} \\ \dot{v} \end{bmatrix} = \begin{bmatrix} \overline{f} \\ \tau_c \\ \underline{f} \end{bmatrix} \quad \text{Eq. (18)}$$

where $\underline{f}$ is set to the forces $-f_{cen} - f_{cor} - f_{damp} - f_{int} + f_{grav}$.

The generalized mass matrices are either constant ($\underline{M}$, $\underline{M1}$, $\underline{M3}$, $\underline{M6}$), consist of constant blocks ($\underline{M4}$), or are or consist of blocks that are linearly dependent on the displacements or velocities of the deformable bodies (see supplemental explanation at end of description). Hence, they are well-suited for precomputation.

Note that while these mass matrices may be similar to ones previously derived, the relative formulation differs in the following two fundamental ways. First, others' multi-domain simulation works on deformable bodies only, time-stepping each body in relative coordinates of the deformable subdomain of its parent. Hence, prior methods only work on hierarchical input and do not support loops. Because the inventors represent deformable relative to a rigid body and time-step all of the rigid bodies in global coordinates, the inventors' computational method can couple deformable bodies to several rigid bodies. This supports loops in the robotic character assemblies. Second, in the prior systems, frame rotations and accelerations were extracted from the previous state when the inertial forces were integrated. Hence, previous work involved integrating the latter explicitly. In contrast, the inertial forces in the new computational method depend on the next state of both the rigid and deformable bodies, which enables stable and accurate integration with an implicit scheme.

With regard to reduced simulation in relative coordinates, local deformations of individual deformable bodies can be expressed in a subspace while keeping the accuracy required for desired retargeting. Precomputing modes, $U_r \in \mathbb{R}^{3n \times r}$, r≪3n, one can time-step with the same system (Eq. (18)) as for full simulation, projecting it onto and solving in the reduced space instead. To compute constant (blocks of) mass matrices for the reduced system, the basis $\Phi$ can be set to the reduced basis $\Phi U_r$ (see supplemental explanations at the end of this description for derivations). Precomputing the reduced mass matrices, all of the inertial and gravitational forces can be integrated in $O(r^2)$ flops, without the need for computations in full space (with reliance on cubature for efficient evaluations of reduced internal forces and tangent stiffness). To construct the subspace for the constrained deformations, a PCA basis may be used. To this end, full simulations may be first run of the robotic characters followed by performing mass-PCA on the local displacements of each individual deformable component. It is worth pointing out that this defines subspaces for individual components instead of a single subspace for the entire character.

The next step or process performed by the new controller/design module with vibration suppression involves optimization. To retarget artist-specified (or other) input to a particular physical robot, it is desirable to try to minimize the difference of simulated target states, putting a priority on the suppression of low-frequency motion of large amplitude. Due to the flexibility in the robot's components, the robot deforms under gravity even if the target animation is slowed down to the degree where inertial forces can be neglected. Since one cannot hope to remove deformations due to gravity, a quasi-static solves is first performed with motor angles set according to the input profiles. Performing these quasi-state solves at the same time intervals as used for dynamic simulations defines the target states $\tilde{S}(t)$. In the remainder of this section, a discussion is provided of how to minimize the distance of the simulated states $S(t)$ to target states $\tilde{S}(t)$ while suppressing visible low-frequency vibrations by making adjustments to parameterized motor profiles.

Regarding parameterization, the time-varying motor profiles can be represented as $\theta_i(t, p_i)$ with a spline interpolation, parameterized with parameters $p_i$. Because $C^2$-continuity is used to prevent infinite motor torques in simulations, B-Splines may be used. Collecting the parameters of all motors in a parameter vector p, the parameterized profiles are initialized by fitting them to the input profiles.

Regarding the retargeting objective, a first objective may be to minimize the distance between simulated and target states, integrated over the interval [0, T]. However, with this objective, the system is essentially being asked to remain as-rigid- or as-stiff-as-possible, preventing it from suppressing visible vibrations. The robotic characters studied herein included components that are assumed to be rigid in proximity to mechanical joints or motors. Thinking of them as articulated characters, the inventors aimed at suppressing low-frequency, global vibrations of large amplitude. Hence, the simulated positions of the rigid bodies are asked to remain as-close-as-possible to their target state in absolute coordinates with:

$$g_{pos}(t, U(p)) = \frac{1}{2}\|c(t, U(p)) - \tilde{c}(t)\|^2 \qquad \text{Eq. (19)}$$

If the positions and orientations of all rigid bodies adjacent to the flexible part of a component are all asked or set to remain as-rigid-as-possible, the process is again asking for stiffness and preventing compensation of global vibrations. However, for some applications it may be desirable to be able to penalize derivations of body orientations from a specified target (e.g., for the end effector attached to a robotic character that is holding an object that could spill contents from the object or the like such as a bartender character). To penalize differences between simulated and target orientations, a second objective can be introduced with:

$$g_{ori}(t, U(p)) = \frac{1}{2}((r_x \cdot \tilde{r}_z)^2 + (r_y \cdot \tilde{r}_z)^2 + (r_z \cdot \tilde{r}_x)^2) \qquad \text{Eq. (20)}$$

where the r-axes are the columns of the simulated and target rotations, $R(t, U(p))$ and $\tilde{R}(t)$, of a rigid body. By integrating these differences over time, the retargeting objective is formulated as:

$$G(U(p)) = \int_0^T g(t, U(p)) dt \qquad \text{Eq. (21)}$$

$$g(t, U(t,p)) = \Sigma_k w_{pos}^k(t) g_{pos}^k + w_{ori}^k(t) g_{ori}^k \qquad \text{Eq. (22)}$$

where the time-varying weights, $w_{pos}^k(t)$ and $w_{ori}^k(t)$, for the body k provide a means to emphasize particular fractions of an animation. Note that these weights are constant in the sense that no time derivatives are required for numerical optimization. During retargeting, weights $w_{ori}^k$ are set for most bodies at zero.

Regarding regularization, the objective measures performance with regards to absolute coordinates. To provide a means to penalize relative differences, hence closeness to the artistic input, a regularizer can be formulated that compares the current to the input profiles. In addition, the motor profiles are set or asked to be smooth by penalizing high accelerations as follows:

$$r_{pro}^i(p) = \frac{1}{2}(\theta_i(t,p) - \tilde{\theta}_i(t))^2 \text{ and } r_{acc}^i(p) = \frac{1}{2}(\ddot{\theta}_i(t,p))^2 \qquad \text{Eq. (23)}$$

Analogously to these objectives, the regularization terms are weighed with weights that vary with time but are constant from an optimization perspective in:

$$R(p) = \int_0^T (\Sigma_i w_{pro}^i(t) r_{pro}^i + w_{acc}^i(t) r_{acc}^i) dt \qquad \text{Eq. (24)}$$

Note that the regularizer only depends on the spline parameters but not on the state of the robot.

With regard to DAE-constrained retargeting, to retarget motion profiles to the physical robots, the objective may be minimized under the dynamic equilibrium constraint, $G=0$, satisfied at every $t \in [0, T]$:

$$\min_p G(p, U(p)) + R(p) \qquad \text{Eq. (25)}$$

$$\text{subject to } G(t, p, S(t, p), \dot{S}(t, p)) = 0 \text{ and}$$

$$S(t_0) = S_0$$

Because it is assumed that the system is at rest at the start of an animation sequence, the initial conditions $S_0$ do not depend on the parameters p.

At this point in the description, it may be useful to turn to the adjoint system and the objective gradient. While sensitivity analysis and adjoint method have become standard tools to implicitly enforce quasi-static equilibrium constraints in minimizations of design objectives, the computation of analytical gradients of the retargeting objective requires more machinery. Like for quasi-static problems, one can solve the equilibrium constraint whenever adjustments are made to spline parameters and then seek to evaluate the objective or objective gradient. To compute analytical gradients for DAE models, there are two options: forward and backward sensitivity analysis. If the number of parameters is small and not exceeding the number of simulation DOFs, forward analysis is preferable. In all other circumstances, backward analysis is the method of choice. Because the number of the state variables in the new computational tool is in the order of hundreds (for reduced simulation) and the number of parameters in the order of thousands, the inventors relied on backward analysis (with the understanding forward analysis may be practical in other applications).

Pointing the reader to the supplemental material at the end of this description for a detailed derivation, a recipe is provided here of how the inventors compute analytical gradients. Upon parameter changes, the simulation DAE, G=0 for t∈[0, T], is solved and the states S(t) are stored for later use. By time-stepping backwards, the linear DAE is then solved with:

$$\begin{bmatrix} E & \\ & M^T \end{bmatrix} \dot{\lambda} = \left( -[\dot{U}^T M_U^T] + \begin{bmatrix} G_U^T \\ G_V^T \\ G_\Lambda^T \end{bmatrix} \right) \lambda + \begin{bmatrix} g_U^T \\ g_V^T \end{bmatrix} \quad \text{Eq. (26)}$$

with initial conditions, $\lambda(T)=0$, for the adjoint variables $\lambda(t)$. In evaluations of gradients $g_U$ and $g_V$ of the objective, Jacobians $G_U$, $G_V$, and $G_\Lambda$ of the constrained dynamics equations (Eq. (10)) and the generalized mass matrix M and its Jacobian with regard to generalized positions, the states S(t) can be used from the solve of the simulation DAE. Then, the objective gradient can be evaluated as:

$$\frac{dG}{dp} = -\int_0^T \lambda^T G_p dt \quad \text{Eq. (27)}$$

where the states S(t) are used from forward-stepping G=0 in evaluations of Jacobian $G_p$ and $\lambda(t)$ from backward-stepping the corresponding adjoint system.

Discretizing both DAEs (Eqs. (10) and (26)) with a BDF2 scheme with the same time interval (dividing the interval [0, T] by the number of desired time steps), correspondence is ensured along the time axis. For numerical integration of the objective and objective gradient, one can rely on a cubic Simpson rule and for minimization of the objective on a standard BFGS.

Now, it may be useful to describe the results of use of the new vibration-minimizing motion retargeting technique to generate output and use of this output to control robots. The inventors used the computational framework to optimize six examples with seven different motion sequences, ranging from didactic mechanical systems to full-body robotic characters. By progressively increasing the complexity of the assemblies, the target motion sequence, and the physical size of the demos, the inventors have demonstrated the suitability of their method for complex and large-scale robotic systems. For all the examples, the following were generated (and are shown, at least in part, in the attached figures): the target animation sequence, the naïve playback of the target animation on the physical robot or robotic character, and the playback (i.e., control of the robot with control signals generated based on the output of the new computational framework) of the optimized animation on the physical robot or robotic character. The self-weight gravity was modeled across all the deformable and rigid components in the results, and the static configuration under gravity was used as the initial conditions to the simulation. The target animation trajectory was estimated by running a quasi-static simulation through the whole animation sequence.

Regarding fabrication, all the demonstrators/test robots were driven with Dynamixel XM-430-W210 servomotors, controlled from a PC through a Dynamixel U2D2 interface. The servos provided sufficiently high torque such that one can assume them to follow the specified motor angle trajectory with no derivation. The test robots were assembled using a combination of off-the-shelf Dynamixel mounting brackets, a small number of custom aluminum machined connectors, spring steel rods (diameters 4 and 5 mm) and 3D-printed parts. Structural parts were printed with Digital ABS material on an Objet Connex 350 and parts for visual appearance were printed with PLA on an Ultimaker 2+. Flat parts for the 13-DOF robot were laser cut from acetal sheets. The 100 g and 200 g weights were machined from brass.

Figure 5:
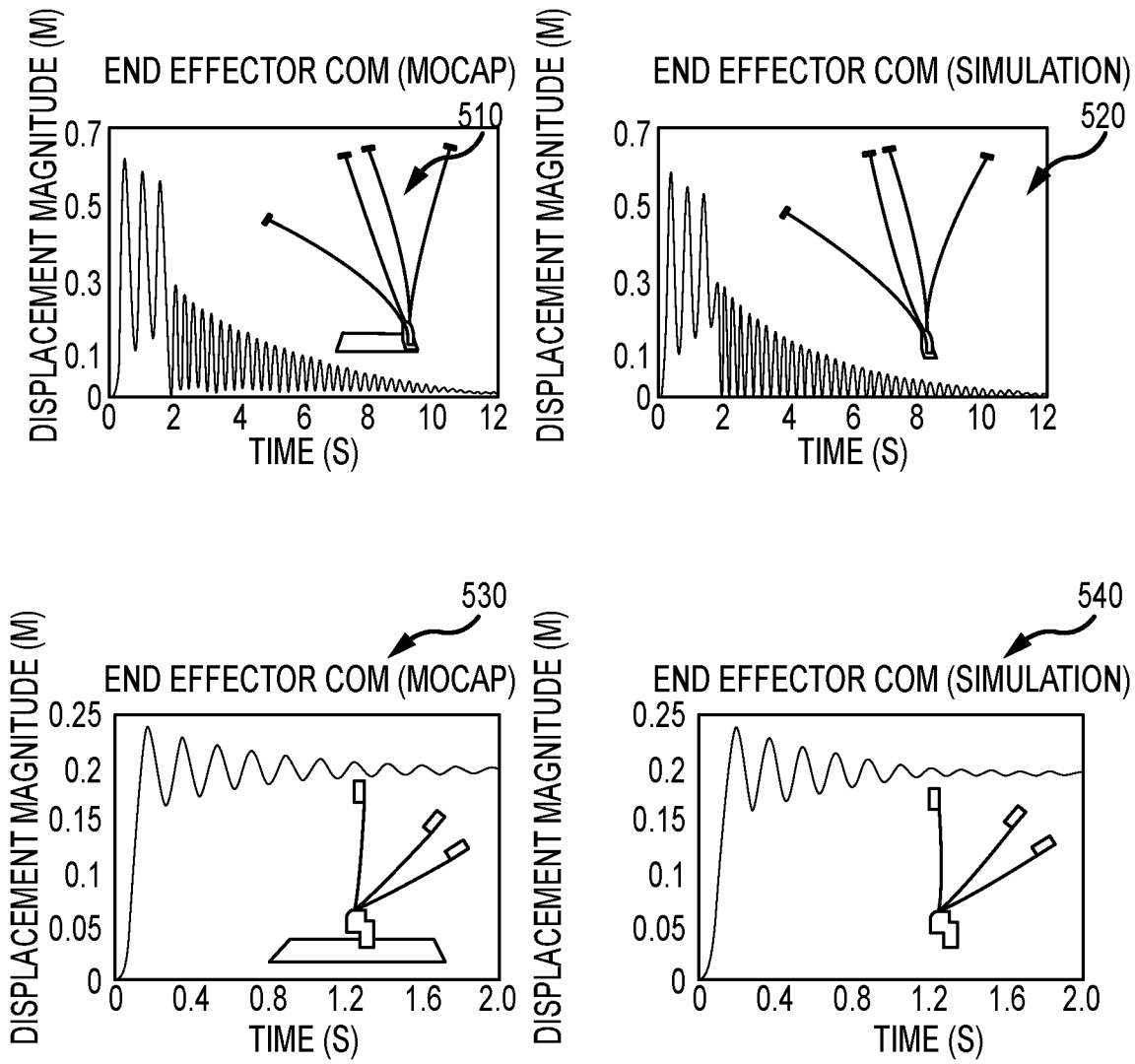
FIG. 5 provides graphs of displacement magnitude versus end effector first appearance; use Center of Mass (COM) during material fitting of a testing process carried out by the inventors for the vibration-minimizing techniques of the present description.

Regarding material fitting, in order to accurately simulate the dynamics, the physical parameters (such as Young's modulus and damping coefficients) were fitted to the deformable rod and the 3D-printed material by comparing the simulation results to the motion captured data. FIG. 5, with graphs 510, 520, 530, and 540, shows the physical setup the inventors used to mount the deformable body, either a rod or a 3D-printed piece, on a single-DOF motor. As shown, using motion capture data, one can fit elastic and damping properties for FEM simulation of the deformable rod and 3D-printed material. Parameters were fitted with bisection, and the final parameters were obtained within five iterations. The simulation data fits well with the mocap data, and the obtained material parameters were in agreement with values from the literature. In the material fitting, a 100 g rigid mass was attached to the end of the deformable body, such that the physical properties were measured in the frequency range of interest. The deformable body vibrates due to the motor rotation, and an OptiTrack system was used to capture the end effector motion. It was observed that the reduced simulation results closely matched the captured motion (see graphs 520 and 540). The simulation accuracy benefits significantly from using quadratic finite elements and due to the implicit BDF2 scheme one does not observe numerical damping problems.

Figure 6:
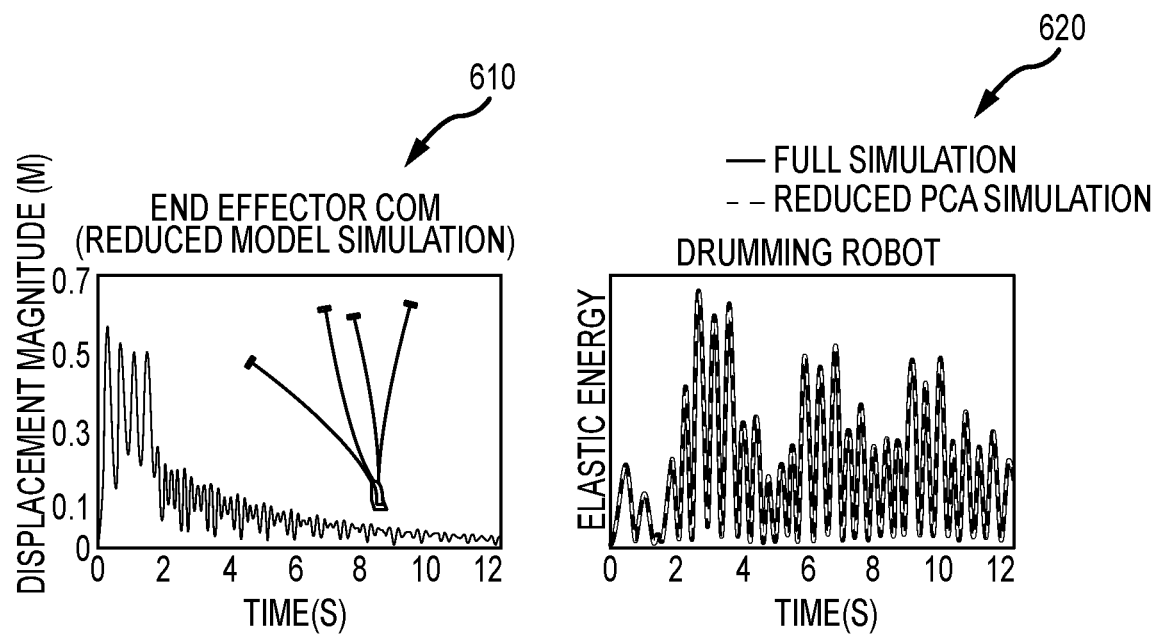
FIG. 6 are graphs showing use of linear modes and modal derivatives and applying the mass-Principal Component Analysis (PCA) basis reduced from full Boxer simulation data to one exemplary robotic character motion.

With regard to validation, in the experiments, mass-PCA modes were used instead of standard linear modes for multiple reasons. The vibrations in the systems were moderately large, and a large number of linear modes would therefore be required to express the deformation. For large deformations, linear modes can be augmented with modal derivatives, which are known to provide visually-good dynamics. However, in many cases, the inventors found these to not perform well in their present application as illustrated in the graphs 610 and 620 of FIG. 6 (see graph 610, particularly), where 80 linear modes and modal derivatives (40 FPS were used but still saw significant mismatch). Graph 610 shows results of using linear modes and modal derivatives, where the reduced simulation activates circular motion and the dynamics frequency does not match the mocap data (see graphs 510 and 530 of FIG. 5). Graph 620 shows the results of applying the mass-PCA basis reduced from the full boxer simulation data to the unseen drumming motion, which shows that the reduced simulation very closely matches the full simulation data on the untrained motion. In contrast to the results of graph 610, the PCA modes (graph 520 of FIG. 5) match the captured data well using eleven modes (275 FPS) Moreover, with a sufficient number of PCA modes one can achieve similar accuracy to full simulation, whereas with linear and modal derivatives one has to tune material properties to non-physical values due to the numerical stiffening. For the present animation retargeting problem, PCA modes suffice to express the observed vibrations and can even extrapolate to different motions with similar vibrations (see graph 620 in FIG. 6). Different from standard linear modes, PCA modes do not introduce any locking artifacts due to constraints as the full simulation enforces the constraints across the motion.

Figure 7:
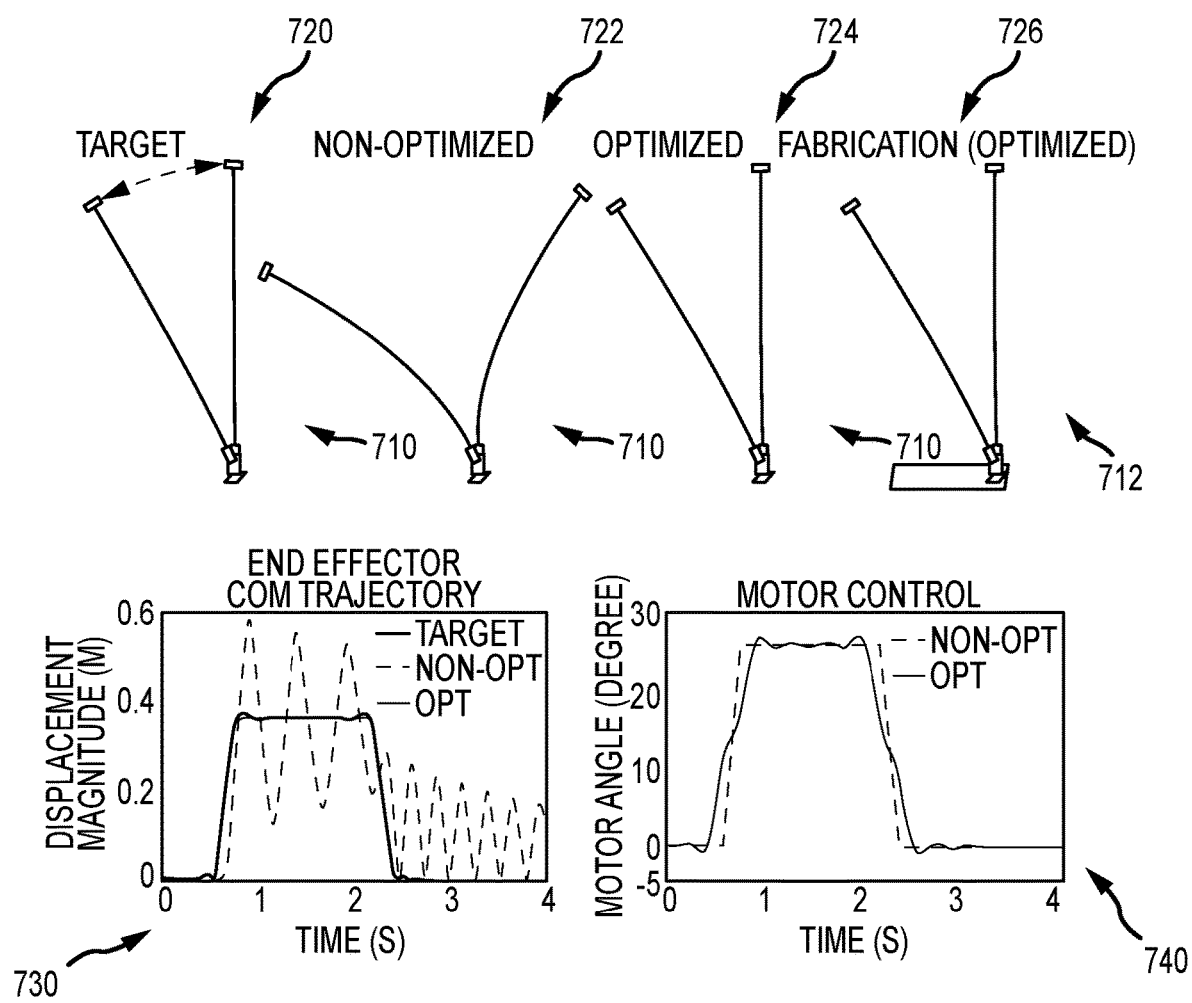
FIG. 7 illustrates results of testing of a single motor single rod robotic system using the vibration-minimizing technique discussed herein.

The first example is a robotic system in the form of a single vertical deformable rod (spring steel, 70 cm height) mounted on a servo-motor, with a 100 g mass attached at the end. FIG. 7 illustrates (with animation frames) testing of such a target robot 710 and fabricated robot 712, during target animations 720, non-optimized playback 722, optimized playback 724, and optimized control of a fabricated robot 712 along with graphical representations or trajectory plots 730 and 740 of the test results. As shown, by preempting the movement of the input animation (see graph 740), the optimized control produces a motion sequence that closely matches the target, as indicated by the animation frames of graphs 720-726 and trajectory plot of graph 730.

In this test, starting from the vertical rest configuration, the motor was rotated by 30 degrees, paused for 1.5 seconds, and then returned to the rest configuration. With the non-optimized piecewise linear motor control, the compliant rod vibrates substantially around the target poses and deviated from the target motion significantly. The optimization taught herein uses the center of mass (COM) trajectory of the end effector as the objective. It can be observed that the optimized motor control suppresses the vibration, while the timing of the intended motion is kept as closely as possible. It can be seen that this is done in part by smoothing out the transitions to poses and, in part, by preempting the motions and adding deformations ahead that cancel oscillations.

Figure 8:
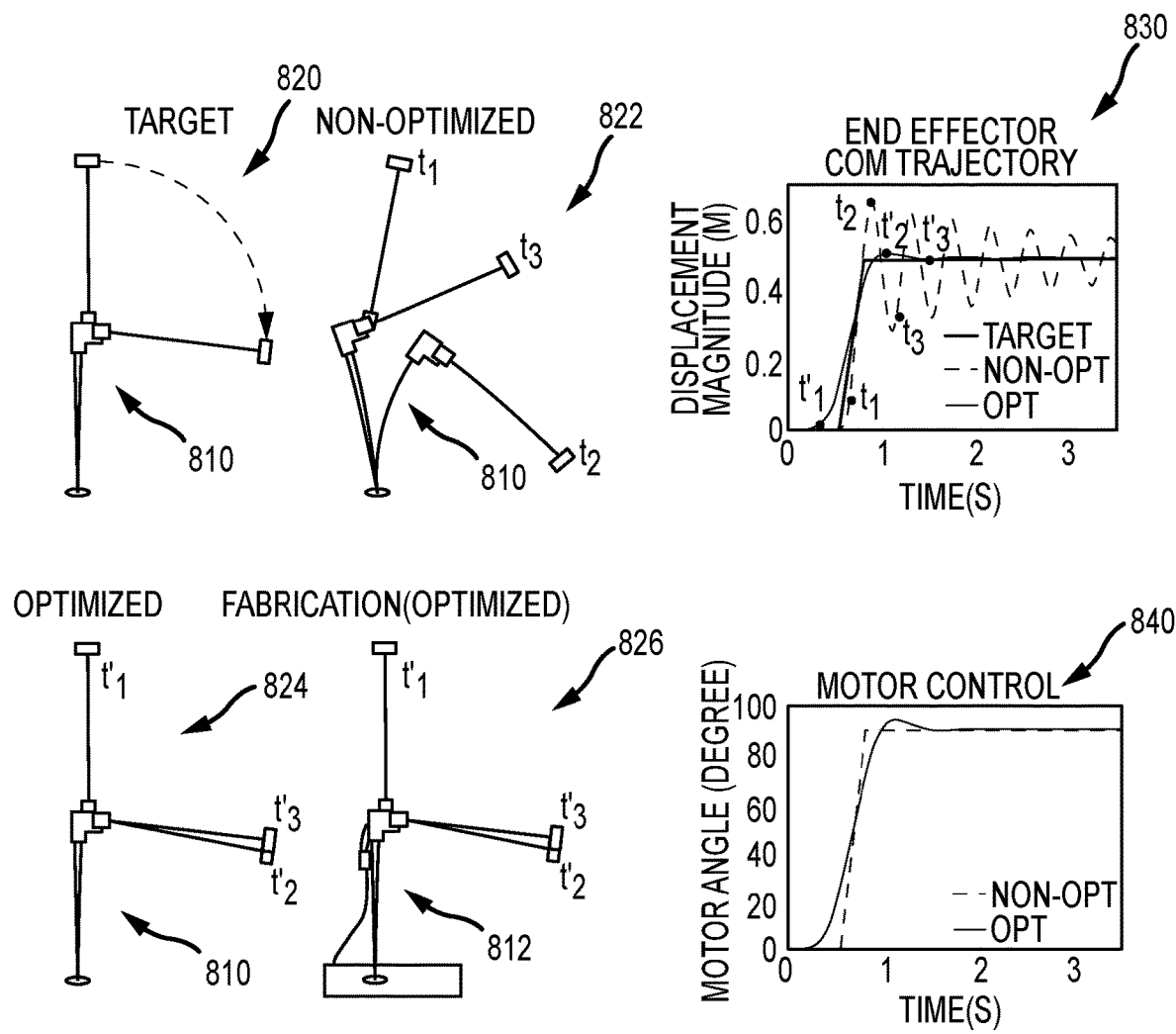
FIG. 8 illustrates results of testing of a single motor two rod robotic system similar to FIG. 7.

Extending the first example, a second exemplary test robot can be provided by moving the motor from the base to the middle where two 30 cm compliant rods can be connected. FIG. 8 illustrates results of testing of such a single motor two rod robot with the target robot 810 and fabricated robot 812 with animation frames during target 820, non-optimized playback 822, optimized playback 824, and optimized controlled motion 826 of fabricated robot 812 along with graphs 830 and 840 showing test results including end effector trajectory and motor control. Compared to the piecewise linear motor control, the optimized smooth control signal used for fabricated robot 812 as shown at 826 successfully suppresses the variation to be under a very small amount. Similar to the first example, a 200 g rigid mass was attached as the end effector. Starting from the straight vertical pose, the upper rod was rotated by 90 degrees to a horizontal pose. Due to the mass inertia, the lower rod deforms and under the non-optimized motor control, the system vibrates significantly. The optimization process taught herein uses the COM of both the end effector and the motor in the objectives. FIG. 8 shows that the optimization result successfully removes the unwanted vibrations to a large degree.

As a third example, the robot takes the form of a dancer to increase the complexity to a 4-DOF character assembly where a 25 cm rod that represents the dancer's body and two arms are connected at the clavicle. This can be seen in FIG. 9.

In this test, each arm of the robot included two motors at the shoulder, one deformable rod as the arm, and a 200 g mass as the hand. The target motion was an 8.5-second dance sequence featuring expressive 3D arm movements. A naïve transfer of the motion sequence to the servo-motors causes very significant vibrations, in particular due to the waving motion of the left hand (see series 920 in FIG. 9), causing the resulting motion of the physical character to very different from the target movements (input animation).

Figure 9:
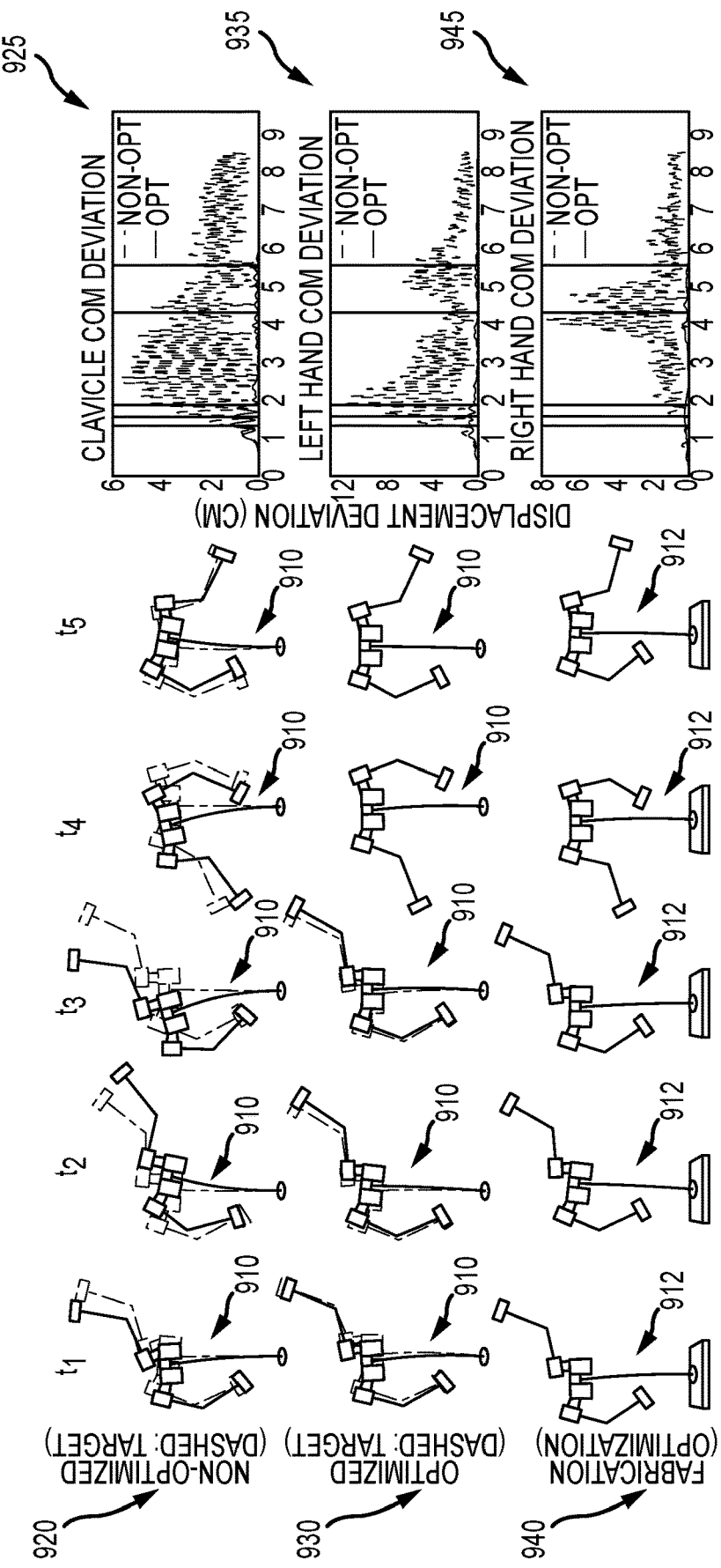
FIG. 9 illustrates results of testing of a dancer robotic system similar to FIGS. 7 and 8.

FIG. 9 shows a target/design robot 910 performing a series of movements 920 (with the robot shown over the top of input/target animations) with resulting COM deviation in graph 925, with the target/design robot 910 performing a series of optimized movements 930 with resulting COM deviation in graph 935, and with the fabricated robot 912 performing the series of optimized movements 940 with resulting COM deviation in graph 945. Five representative frames are provided for non-optimized and optimized simulation overlaid with the target animation and for the retargeted optimized motion on the physical character. Displacement error visualization on the clavicle, left, and right hand are provided in graphs 925, 935, and 945. Here, the presented optimized result corresponds to the first experiment where all the matching targets were assigned with a weight of unity. The first three frames show the waving motion while the last two frames are dancing poses. The non-optimized one shows substantial vibrations on the body rod which lead to large deviation everywhere whereas the optimized control successfully removes the excess vibration. Note, the vibration-minimizing control method does not completely cancel the deviation during the waving sequence but with such a small amount of body rod deformation the vibration caused from waving can largely be cancelled for the subsequent motion.

In order to suppress the undesirable vibrations, the control signals for the four motors were optimized such that the COM trajectories of both the hands and the clavicle match the target as closely as possible. To demonstrate the user control over the optimization results, the inventors experimented with three different sets of weights on the target matching terms. In the first experiment, a weight of unity was assigned to all the target points (which may be user-selected points on rigid components and also labeled "marker points" or "tracked points"), as shown with marker points 250 and 254 in FIG. 2, for example. The resulting motion was close to the target animation sequence, without inducing noticeable vibrations. However, for the waving sequence, the displacement of the left hand end effector was mostly achieved by the deformation of the body rod as opposed to the rotation of the corresponding shoulder motors. Therefore, in the second experiment, the objective weight for trajectory matching was increased at the clavicle by 100 times. As expected, little vibration was still achieved across the motion sequence and, at the same time, the deformation at the torso was also reduced, at the expense of weakening the waving motion. The system also allows for time-varying weights, enabling the user to control the significance of separate motion segments. In the third experiment, in order to restore the waving motion, a time-varying weight was assigned to the left hand over the motion by increasing its weight by 100 times specifically for the waving segment. Interestingly, in this scenario, the right arm deviates more from the input target and performs a counteracting motion to balance the wave and prevent vibrations. These examples demonstrate that the new control system is able to suppress vibrations in multiple different ways and can, thus, be tuned by the user in order to match a particular artistic intent.

Figure 10:
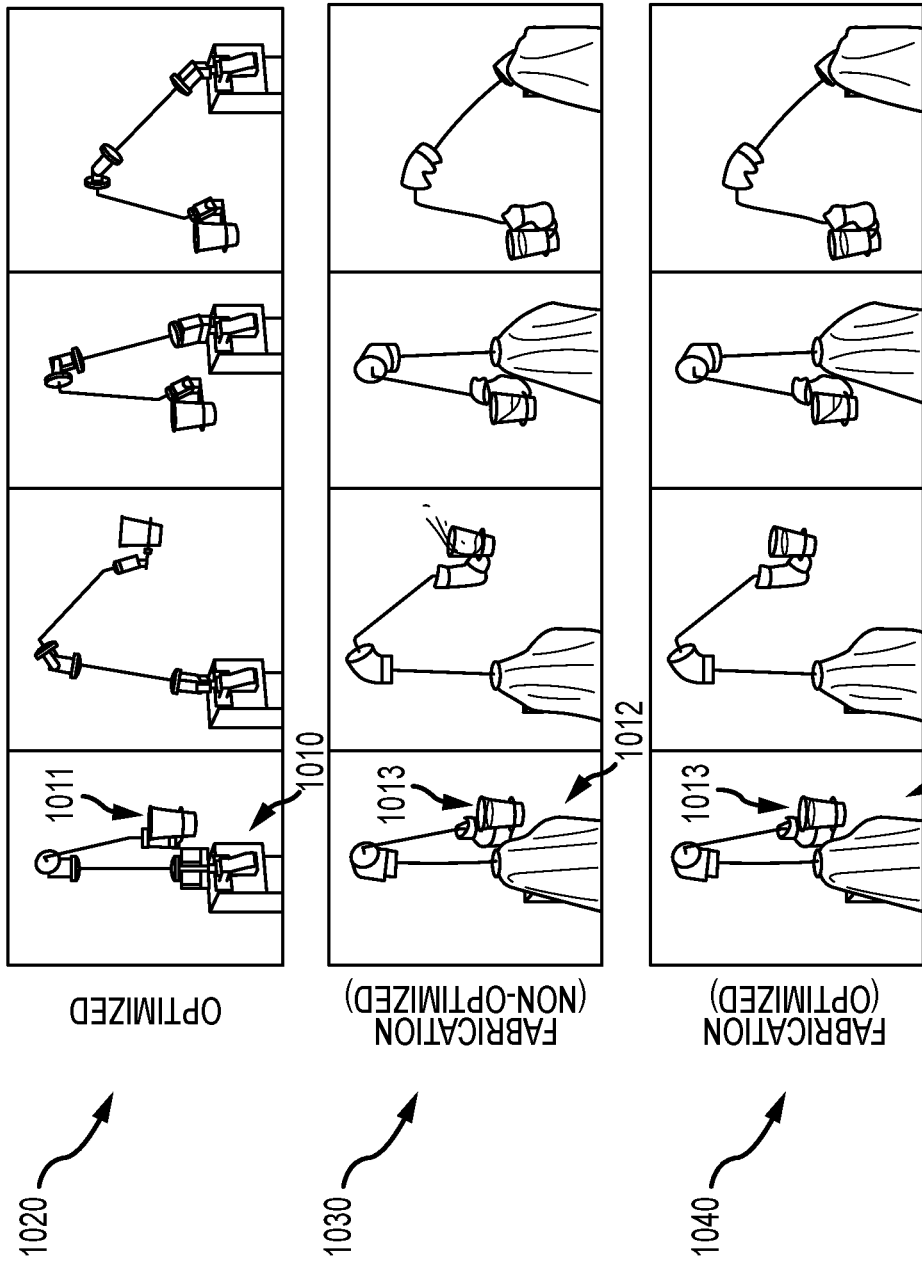
FIG. 10 illustrates results of testing of a bartender robotic system similar to FIGS. 7-9.
Figure 11:
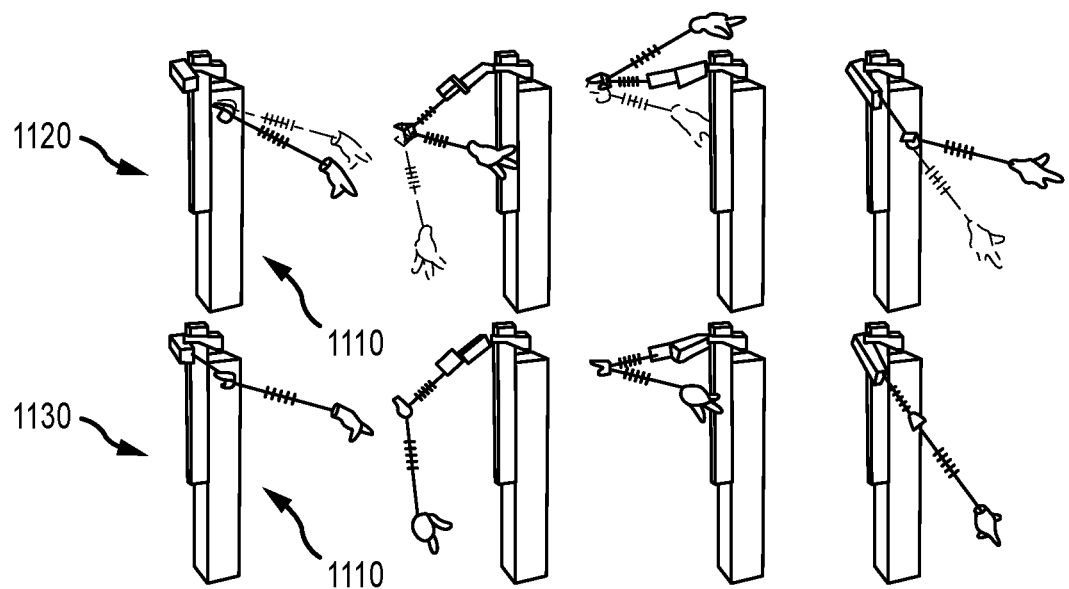
FIG. 11 illustrates results of testing of a rapper's arm robotic system similar to FIGS. 7-10.
Figure 12:
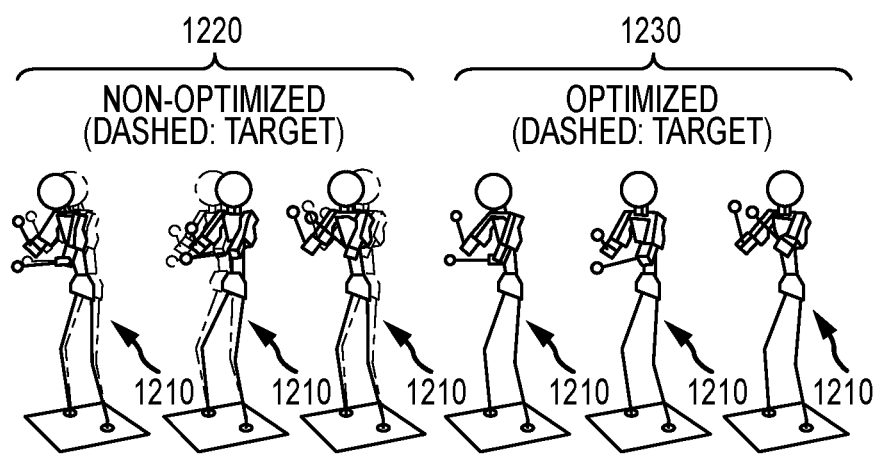
FIG. 12 illustrates results of testing of a drummer robotic system similar to FIGS. 7-11.

As well as being visually displeasing, vibrations can also negatively impact the functional performance of robot characters. In a fourth demonstrator/test robot, a 4-DOF bartender robot arm (3-DOF translation, 1-DOF rotation at the end effector) is studied, that is holding a glass of water and moving it through three locations. This is shown in FIG. 10 with target robot 1010 holding water in glass 1011 and with fabricated robot 1012 holding water in glass 1013. The top row provides a set of frames 1020 of the simulated optimization result for four frames in the animation/motion sequence, with the target being matched almost perfectly. The middle row provides another set of frames 1030 showing the physical robot 1012 executing the non-optimized trajectory and spilling the drink (frames two and four), and the bottom row provided a set of frames 1040 showing the physical robot 1012 following the optimized trajectory with no spillage (i.e., little to no unwanted vibrations).

In the bartender robot test, the height of the robot (without the base) was 45 cm. For this demonstration/test, the controller was operated so as to not only try to match the position trajectories at the elbow and end effector but also match the end effector orientation such that the glass remains upright. The input motion trajectory when played back on the robot, causes the robot to spill the drink due to the vibration. By running the new optimization, though, on this input, the robot can be controlled to perform the same motion sequence without spilling the drink. It was assumed that the water in the cup behaves as a rigid body of fixed mass, and although this is an oversimplification, it can be seen that it is sufficient for this testing. FIG. 10 shows the optimized simulation result at 1030, the non-optimized motion at 1020 that cause the drink to spill, and the optimized robot 1012 at 1040 that does not spill the drink. This test showcases the new method and indicates it has applications in functional areas of robotics (not just visual applications).

In another test case, a rapper's arm was controlled to reduce vibration to demonstrate that the method supports mechanical systems with kinematics loops. The robotic system was simulated as shown with robot 1110 under non-optimized control with sequence 1120 in which the arm deviates significantly from the input sequence. Optimized control is shown in sequence 1130 for simulated robot 1110 and provides dynamic motion that is visually indistinguishable from the target. The tested robotic system (simulated at 1110) included two 3D-printed compliant arm components connected with a 4-bar linkage and four motors controlling the 3D shoulder motion and a 1-DOF elbow motion. Unlike conventional rigid 4-bar linkages, the test rapper robot had two compliant links and two rigid links that were connected with two hinge joints, one universal joint and one spherical joint in order to obtain the correct number of constraints while allowing for the deformable components to move out-of-plane. The input motion was designed to be a rapping sequence where the arm is moving in a wide-range 3D space. The optimized motor controls successfully remove the substantial vibrations that are present when operating the robot with the non-optimized control input.

The scalability of the computational framework was examined by retargeting a drumming motion sequence for a 13-DOF full-body robot with a height of 80 cm. This is shown with simulated/target robot 1210 performing non-optimized motion overlaid with target motion in frames 1220, with simulated/target robot 1210 performing optimized motion in frames 1230, and with a fabricated physical robot 1212 performing the retargeted motions in frames 1240. With the non-optimized control, the vibration is excessive whereas vibration is nearly invisible with optimized control as seen in sequence 1230.

Each arm had 3 DOFs at the shoulder and 1 DOF at the elbow. In addition, the upper body was actuated with five motors controlling the motion of the head, neck, torso, spine, and pelvis. The character legs were two 45 cm rods fixed at a base, and the lower arms were 10 cm rods. The entire drumming motion lasted 10 seconds. It can be seen that the main deformation mode, which is significantly excited by the drumming motion, was a backward-forward swaying motion. Interestingly, for the non-optimized case, the vibration amplitude exhibits significant periodic vibration over time (at some points being close to zero), and this is seen both in the simulated and the physical systems. This would make it very challenging to manually smoothen or offset control for vibration suppression. The optimization provided by the new controller/design system targets the center of mass trajectories of the head, pelvis, and both hands. Without any noticeable degeneracy of motion quality, the vibration error was successfully suppressed for the whole system (e.g., peak amplitude reduced from 7 cm to 1 cm).

Figure 13:
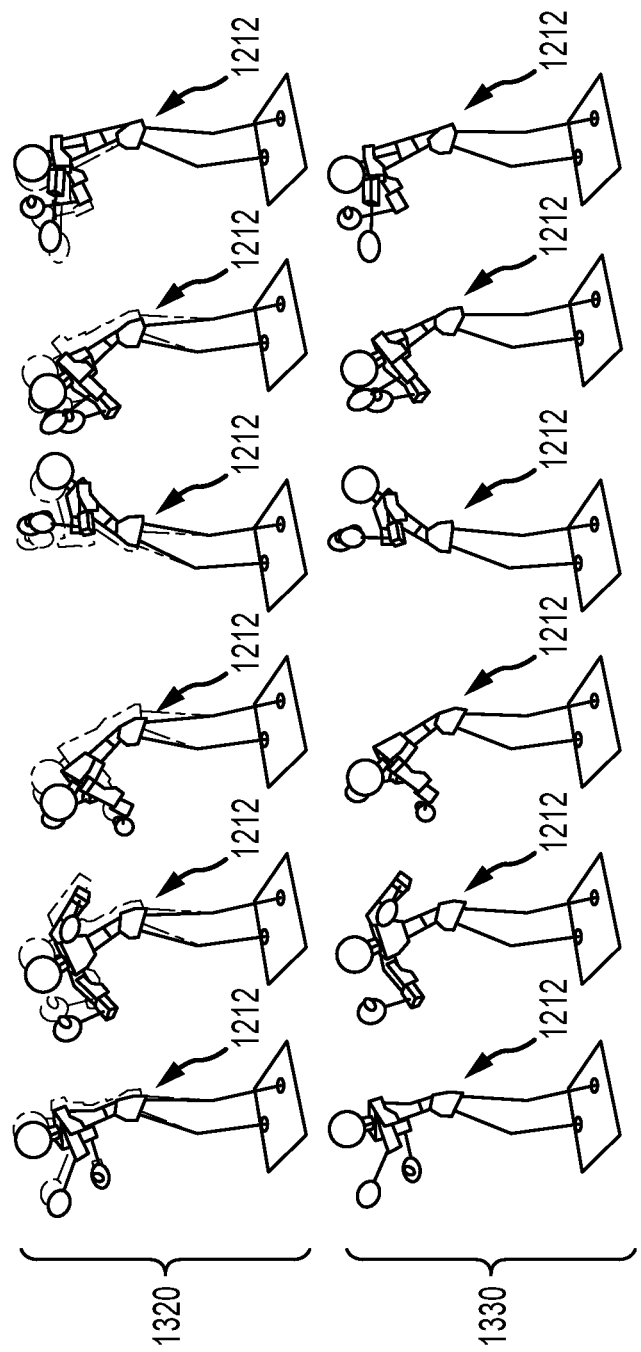
FIG. 13 illustrates results of testing of a boxing robotic system similar to FIGS. 7-12.

Finally, the inventors showed that a different motion sequence, i.e., boxing, retargeted to the same full-body character as the drumming robot, where the inventors only replace the hands with boxing gloves. FIG. 13 illustrates the robot 1210 (modified to include boxing gloves as end effectors rather than hands) in a series of movements with frames 1320 during non-optimized control (playback of input animation) and in a series of movement with frames 1330 during optimized control, which largely removes the vibration and matches the target motions with high visual quality. The physical robot executing the optimized trajectory is shown in FIG. 1. Unlike the drumming motion with repetitive beats, the boxing motion contains more fast and abrupt motions. The naïve retargeting causes excessive vibrations, especially when the character dodges and moves his upper body backward and forward. With the same objective and optimization parameters as for the drummer, the optimized motor signals (output by the optimization module taught herein) control the deviation error under 1.5 cm (compared to 9 cm before the optimization) while preserving the input animation without noticeable visual difference.

With regard to one useful practical implementation of the method in a computing system/robot controller (offline or online and offboard or onboard the robot being controlled), the simulations and optimizations were performed on a machine with an Intel Core i7700 processor (4 cores, 4.2 GHz) with 32 GB of RAM. The evaluation of internal force and tangent stiffness matrices of the deformable bodies are performed in multi-threads. For minimization, the inventors relied on the standard interior-point method and BFGS as implemented in the KNITRO software package. In the experiments, the relative residual tolerance was set to $10^{-4}$ and the maximum number of minimization iterations to 100. The minimizations converged well and substantially decreased the vibrations from the input sequence, without sacrificing the quality of motion.

In the above description, a computational tool has been presented that retargets artist-created animation (or other input animation) onto physical robotic characters while minimizing unwanted vibrations due to system dynamics. Using model reduction to speed up simulation, the two-way coupling between rigid bodies and flexible bodies was accurately modeled. Leveraging this simulation model, the motor control was optimized via a continuous adjoint method such that the physical character motion matches the artistic intent as closely as possible. The approach provides an automated way to retarget digital animations onto physical characters and could also be used to evaluate the design of a physical robot before it is built. Moreover, by suppressing vibrations with the tuning of motor trajectories, the tool enables the design of expressive robotic characters that can be less stiff and, therefore, lighter, cheaper, and more accessible to all.

Beyond the application of motion retargeting, the pipeline incorporates elements that will in general be valuable for fast simulation of multi-body systems incorporating coupled rigid-body dynamics and deformable bodies. The simulator captures the dynamic response of the physical characters well. However, it can be observed that there is still some deviation between the simulated dynamics and physical system, leading to small residual vibrations. This is likely due to the assumptions of perfectly stiff motor controls and mechanical joints, which in reality will have some non-infinite stiffness. A promising approach for eliminating these small residual vibrations would be to implement an online closed-loop controller on the robot, where the tracked marker point trajectory is measured, and the motor control adjusted accordingly. This would make the approach more robust to modeling errors and to unexpected variations in the external loads.

In one implementation, the user decides which components to model as rigid and which to model as deformable. In many applications, this distinction is easy to make. However, for very large and complex assemblies, it could be beneficial to automate this selection. While the design of the robotic characters is held fixed and focus is provided on the control problem herein, the formulation of the computational tool would also support the optimization of parameterized dimensions of components or the positions and orientations of mechanical joints.

Below, implementation-ready generalized mass matrices are provided for the relative coordinate formulation (with detailed derivatives provided afterwards). In derivations of mass matrices, one can make use of the observation that the interpolated displacements can be written as sums of columns of the 3×3n basis matrix times a single entry $u_k$ of the displacements $u \in \mathbb{R}^{3n}$ to provide:

$$u(X,t) = \Phi(X)u(t) = \Sigma_k \Phi_k(X) u_k(t) \quad \text{Eq. (28)}$$

The mass matrices are:

$$\underline{M1} = \int_\Omega \rho \Phi^T [X]_x dX \quad \text{Eq. (29)}$$

$$\underline{M2}(u) = \sum_k \left( \int_\Omega \rho \Phi^T [\Phi_k]_x dX \right) u_k$$

$$\underline{M3} = \int_\Omega \rho \Phi^T dX$$

$$\underline{M4}_j = \int_\Omega \rho X \Phi_j^T dX$$

$$\underline{M5}_j(u) = \sum_k \left( \int_\Omega \rho \Phi_k \Phi_j^T dX \right) u_k$$

$$\underline{M6} = \int_\Omega \rho \Phi^T X \, dX$$

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The following provides supplemental materials relevant to the materials discussed in detail above including derivations of the relative coordinate formulation of the equations of motion and derivations of the adjoint system that is used to compute analytical gradients for the retargeting optimization.

Turning first to derivation of the relative coordinate formulation, the deformed configuration is provided by:

$$x(X,t) = R(t)[X + \Phi(X)u(t)] + c(t)$$

In deriving the corresponding velocity and acceleration, the arguments in the expression $x = R(X + \Phi u) + c$ are dropped.

The velocity of the deformed configuration is:

$$\dot{x} = \dot{R}(X + \Phi u) + R\Phi\dot{u} + \dot{c}$$
$$= [\omega]_x R(X + \Phi u) + R\Phi v + w$$

and its acceleration:

$$\ddot{x} = \ddot{R}(X + \Phi u) + 2\dot{R}\Phi\dot{u} + R\Phi\ddot{u} + \ddot{c}$$
$$= ([\dot{\omega}]_x R + [\omega]_x^2 R)(X + \Phi u) + 2[\omega]_x R\Phi v + R\Phi\dot{v} + \dot{w}$$
$$= R\Phi v + [\dot{\omega}]_x R(X + \Phi u) + \dot{w} + [\omega]_x^2 R(x + \Phi u) + 2[\omega]_x R\Phi v$$
$$= \underbrace{R\Phi\dot{v}}_{\text{db acc.}} \underbrace{-R([X]_x + [\Phi u]_x)R^T\dot{\omega} + \dot{w}}_{\text{Rb acc.}} + \underbrace{R[R^T\omega]_x^2(X + \Phi u)}_{\text{Centrifugal acc.}} + \underbrace{2R[R^T\omega]_x \Phi v}_{\text{Coriolis acc.}}$$

In the above derivations, the identities $\dot{R} = [\omega]_x R$ and $\ddot{R} = [\dot{\omega}]_x R + [\omega]_x^2 R$ are used in the first three lines. Because $[R^T a] \times b = R^T a \times R^T R b = R^T [a]_x R b$, the identity $R^T [a]_x R = [R^T a]_x$ holds. For acceleration terms that have subexpressions $[a]_x Rb$, the latter identity is used to move the rotation matrix to the left $RR^T [a]_x Rb = R[R^T a]_x b$. For the rigid body acceleration term, the identities $[a]_x b = -[b]_x a$ and $[a+b]_x = [a]_x + [b]_x$ are used.

To form the inertial forces, $$\int_\Omega \Phi^T R^T \rho \ddot{x} dX = \int_\Omega \rho \Phi^T R^T \ddot{x} dX$$

the individual acceleration terms are integrated. When integrating the acceleration of the deformable body (db acc.), it is seen why it is useful to multiply with the transpose of the rigid body rotation:

$$\int_\Omega \rho \Phi^T R^T R \Phi \dot{v} dX = (\int_\Omega \rho \Phi^T \Phi dX) \dot{v} = \underline{M} \dot{v}$$

Integration results in the same mass matrix as for the absolute coordinate formulation $\underline{M} \in \mathbb{R}^{3n \times 3n}$.

Integration of the rigid body acceleration (rb acc.) leads to a force:

$$-(\underline{M1} + \underline{M2}(u))R^T \dot{\omega} + \underline{M3} R^T \dot{w}$$

that depends on a total of three mass matrices:

$$\underline{M1} = \int_\Omega \rho \Phi^T [X]_x dX$$

$$\underline{M2}(u) = \int_\Omega \rho \Phi^T [\Phi u]_x dX$$

$$\underline{M3} = \int_\Omega \rho \Phi^T dX$$

where $\underline{M1} \in \mathbb{R}^{3n \times 3}$ and $\underline{M3} \in \mathbb{R}^{3n \times 3}$ are constant and $\underline{M2} \in \mathbb{R}^{3n \times 3}$ depends on the displacement. To efficiently computer $\underline{M2}$, the displacement $\Phi_u$ is substituted with $\Sigma_{k=1}^{3n} \Phi_k u_k$ to give:

$$\underline{M2}(u) = \sum_{k=1}^{3n} \left( \int_\Omega \rho \Phi^T [\Phi_k]_x dX \right) u_k$$

and precompute the 3n×3 blocks in brackets.

To derive the centrifugal forces, the corresponding acceleration (centrifugal acc.) is first split into two terms:

$$R((R^T \omega) \cdot (X + \Phi u)) R^T \omega - R(X + \Phi u)(\omega \cdot \omega)$$

where the identity $a \times (b \times c) = (a \cdot c)b - c(a \cdot b)$ is applied to the subexpression $[R^T \omega]_x^2 (X + \Phi u) = (R^T \omega) \times (R^T \omega) \times (X + \Phi u)$.

To integrate the first term, the integral is split into a sum of integrals and the transpose of the j-th column of $\Phi$:

$$\sum_{k=1}^{3n}\left(\int_{\Omega}\rho\Phi_j^T(R^T\omega)\cdot(X+\Phi_k u_k)\right)R^T\omega\ dX =$$

$$\omega^T R\left(\sum_{k=1}^{3n}\int_{\Omega}\rho(X+\Phi_k u_k)\Phi_j^T\ dX\right)R^T\omega =$$

$$\omega^T R\left(\left(\int_{\Omega}\rho X\Phi_j^T\ dX\right)+\sum_{k=1}^{3n}\left(\int_{\Omega}\rho\Phi_k\Phi_j^T\ dX\right)u_k\right)R^T\omega$$

The derivation of the second term is straightforward.
To form the resulting centrifugal forces:

$$f_{cen}(q,u,\omega)=\sum_{j=1}^{3n}\omega^T R(\underline{M4}_j+\underline{M5}_j(u))R^T\omega e_j$$

$$-(\underline{M6}+\underline{M}u)(\omega\cdot\omega)$$

where $e_j$ is the j-th column of the 3n×3n identity matrix, and the additional mass matrices are precomputed:

$$\underline{M4}_j=\int_{\Omega}\rho X\Phi_j^T\ dX$$

$$\underline{M5}_j(u)=\sum_{k=1}^{3n}\left(\int_{\Omega}\rho\Phi_k\Phi_j^T\ dX\right)u_k$$

$$\underline{M6}=\int_{\Omega}\rho\Phi_j^T\ XdX$$

Analogously to M2, the blocks in brackets for matrix $\underline{M5}_j$ are precomputed. Because $\Phi$ has 3n columns, there are 3n 3×3 matrices $\underline{M4}_j$ and $\underline{M5}_j(u)$ (j=1, . . . , 3n). $\underline{M6}$ is a 3n vector.

To derive the Coriolis force:

$$f_{cor}(q,\omega,v)=-2\underline{M2}(v)R^T\omega$$

$[R^T\omega]_x$ is substituted for a and $\Phi v$ for b in the identity $[a]_x b=-[b]_x a$ in the Coriolis term (Coriolis acc.) prior to integration. For this term, M2 is reused, setting its parameter to the velocities v instead of the displacement u. Note that the fictitious centrifugal and Coriolis forces depend on q because quaternions are used instead of rotation matrices. In some implementations, rotations may be extracted from quaternions R(q).

In a reduced formulation, the displacements are defined as:

$$u(X,t)=\Phi(X)U_r u_r(t)$$

To derive the reduced mass matrices and inertial forces, the full basis $\Phi(X)$ can be replaced with the reduced basis $\Phi_r(X)=\Phi(X)U_r$ in the above derivations. Again, arguments are dropped for conciseness. $\Phi_r$ is now a 3×r-matrix, $u_r$ a r-vector, and $\phi_{r,k}\in\mathbb{R}^3$ the k-th column of $\Phi_r$.

The mass matrices are:

$$\underline{M}_r=U_r^T\underline{M}U_r=E_{r\times r}$$

$$\underline{M1}_r=U_r^T\underline{M1}$$

$$\underline{M2}_r u_r=\left(\sum_{k=1}^{r}\left(\int_{\Omega}\rho\Phi_r^T[\Phi_{r,k}]_x dX\right)u_{r,k}\right)$$

$$\underline{M3}_r=U_r^T\underline{M3}$$

$$\underline{M4}_{r,j}=\int_{\Omega}\rho X\Phi_{r,j}^T dX$$

$$\underline{M5}_{r,j}(u_r)=\sum_{k=1}^{r}\left(\int_{\Omega}\rho\Phi_{r,k}\Phi_{r,j}^T dX\right)u_{r,k}$$

$$\underline{M6}_r=U_r^T\underline{M6}$$

where numerical integration is used to precompute the blocks in brackets for $\underline{M2}_r(u_r)$ and $\underline{M5}_{rj}(u_r)$, and the j-th 3×3 matrices $\underline{M4}_{rj}$.

The inertial forces corresponding to the deformable body (db acc.) reduce to:

$$U_r^T\underline{M}U_r\dot{v}_r=\dot{v}_r$$

and for the rigid body (rb acc.) to:

$$-(\underline{M1}_r+\underline{M2}_r(u_r))R^T\dot{\omega}+\underline{M3}_r R^T\dot{w}$$

The centrifugal force becomes:

$$f_{cen}(q,u_r,\omega)=\sum_{i=1}^{r}\omega^T R(\underline{M4}_{r,j}+\underline{M5}_{r,j}(u))R^T\omega e_j-(\underline{M6}+\underline{M}u)(\omega\cdot\omega)$$

where $e_j$ is the j-th column of the r×r identity matrix, and the reduced Coriolis force is:

$$f_{cor}(q,\omega,v_r)=-2\underline{M2}_r(v_r)R^T\omega$$

With regard to derivation of the adjoint system, one is required to solve the retargeting problem:

$$\min_p G(p,U(p))+R(p)$$

subject to $G(t,p,S(t,p),\dot{S}(t,p))=0$ and $$S(0)=S_0(p)$$

which requires the computation of an analytical gradient $$\frac{dG(p,U(p))}{dp}.$$

While the presented semi-implicit DAE system can easily be brought into standard Hessenberg index-2 form, we prefer to keep the mass matrix M on the left-hand side because it simplifies the adjoint DAE.

To keep the derivation general, the objective is assumed to depend on the state S for the first part of the derivation:

$$G(p,S(p))=\int_0^T g(t,p,S(p))dt$$

The augmented objective with continuous, time-dependent Lagrange multipliers $\lambda(t)$ for the above problem is:

$$I(p,S)=G(p,S)\int_0^T \lambda^T G(t,p,S,\dot{S})dt$$

Because the DAE system is satisfied at every t, the total derivative of G and I are equivalent such that:

$$\frac{dG}{dp}=\int_0^T(g_p+g_S S_p)dt-\int_0^T(G_p+G_S S_p+G_{\dot{S}}\dot{S}_p)dt$$

where subscripts are used for partial derivatives. Note that $S_p$ and $\dot{S}_p$ are total derivatives.

Integration by parts of the term $\lambda^T G_{\dot{S}} \dot{S}_p$:

$$\int_0^T \lambda^T G_{\dot{S}} \dot{S}_p dt = (\lambda^T G_{\dot{S}} S_p)\Big|_0^T - \int_0^T \frac{d}{dt}(\lambda^T G_{\dot{S}}) S_p dt$$

enables the dependence on $\dot{S}_p$ to be turned into a dependence on $S_p$:

$$\frac{dG}{dp} = \int_0^T (g_p - \lambda^T G_p) dt - \int_0^T \left(-g_S + \lambda^T G_S - \frac{d}{dt}(\lambda^T G_{\dot{S}})\right) S_p dt - (\lambda^T G_{\dot{S}} S_p)\Big|_0^T$$

By setting the term in brackets of the second integrand to zero, the adjoint system is then formed:

$$\frac{d}{dt}(\lambda^T G_{\dot{S}}) = \lambda^T G_S + g_S$$

Applying the chain rule and transposing the system, the adjoint DAE is formed:

$$G_{\dot{S}}^T \dot{\lambda} = \left(-\left(\frac{dG_{\dot{S}}}{dt}\right)^T + G_S^T\right)\lambda + g_S^T$$

For this particular DAE system:

$$G = \begin{bmatrix} \dot{U} - T(U)V \\ M(U)\dot{V} - F(U,V) - (C_U(t,U)T(U))^T \Lambda \\ C_t(t,U) + C_U(t,U)T(U)V + \alpha C(t,U) \end{bmatrix} = 0$$

the Jacobian with regard to the state is:

$$G_S = [G_U(t,U,V) G_V(t,U,V) G_\Lambda(t,U)]$$

with columns:

$$G_U = \begin{bmatrix} -T_U(U)V \\ M_U(U)\dot{V} - F_U(U,V) - (C_{U,U}(t,U)T(U) + C_U(t,U)T_U(U))^T \\ C_{t,U}(t,U) + (C_{U,U}(t,U)T(U) + C_U(t,U)T_U(U))V + \alpha C(t,U) \end{bmatrix}$$

$$G_V = \begin{bmatrix} -T(U) \\ -F_V(U,V) \\ C_U(t,U)T(U) \end{bmatrix}, \text{ and } G_\Lambda = [-(C_U(t,U)T(U))^T] \text{ where}$$

$$C_{t,U} = \frac{\partial^2 C}{\partial t \partial U} \text{ and } C_{U,U} = \frac{\partial^2 C}{\partial U^2}.$$

The Jacobian with regard to the time-derivative of the state is:

$$G_{\dot{S}} = \begin{bmatrix} E & \\ & M(U) \end{bmatrix}$$

And its time-derivative is:

$$\frac{dG_{\dot{S}}}{dt} = [M_U(U)\dot{U}]$$

where only the "center" element of the 3-by-3 block matrix is non-zero.

For the particular system discussed herein, g only depends on generalized positions and velocities:

$$g_S = [g_U g_V]$$

In summary, the linear adjoint DAE is:

$$\begin{bmatrix} E & \\ & M^T \end{bmatrix} \dot{\lambda} = \left(-\begin{bmatrix} \dot{U}^T M_U^T \end{bmatrix} + \begin{bmatrix} G_U^T \\ G_V^T \\ G_\Lambda^T \end{bmatrix}\right)\lambda + \begin{bmatrix} g_U^T \\ g_V^T \end{bmatrix}$$

It remains to discuss initial conditions. To evaluate the gradient $$\frac{dG}{dp},$$

one requires:

$$(\lambda^T G_{\dot{S}} S_p)|_{t=0} \text{ and } (\lambda^T G_{\dot{S}} S_p)|_{t=T}$$

At time t=0, the Jacobian $S_p$ is equal to the analytical derivative $$\frac{dS_o}{dp}$$

of the initial conditions $S_0$. If the initial conditions for the adjoint DAE are set to be $\lambda(T)=0$, then:

$$(\lambda^T G_{\dot{S}} S_p)|_{t=T} = 0$$

Note that the initial conditions $S_0$ for the DAE are not dependent on p because the system is assumed to be at rest at the start of an animation. Hence, $S_p$ is zero at time t=0, and, therefore:

$$(\lambda^T G_{\dot{S}} S_p)|_{t=0} = 0$$

If objective g depends on the algebraic variables $\Lambda$, the initial conditions for the adjoint DAE, $\lambda(T)=0$, are in conflict with the adjoint DAE, and an additional treatment is necessary.

In summary, the analytical gradient of the objective is:

$$\frac{dG}{dp} = \int_0^T (g_p - \lambda^T G_p) dt$$

where the adjoint variables $\lambda(T)$ are computed by solving the linear adjoint DAE:

$$\begin{bmatrix} E & \\ & M^T \end{bmatrix} \dot{\lambda} = \left(-\begin{bmatrix} \dot{U}^T M_U^T \end{bmatrix} + \begin{bmatrix} G_U^T \\ G_V^T \\ G_\Lambda^T \end{bmatrix}\right)\lambda + \begin{bmatrix} g_U^T \\ g_V^T \end{bmatrix}$$

with initial conditions.

We claim:

1. A system for suppressing vibration in a robotic system, comprising:
    memory storing a definition of a robot defining a plurality of components of the robot and storing an input animation for the robot specifying motion of the components of the robot over a time period;
    a processor communicatively linked to the memory;
    a simulator provided by the processor running software, wherein the simulator performs a dynamic simulation of the robot performing the input animation including modeling a first set of the components as flexible components and a second set of the components as rigid components, wherein each of the flexible components is coupled at opposite ends to differing ones of the rigid components, and wherein the dynamic simulation predicts vibrations for the robot in performing the defined motion; and
    an optimizer provided by the processor running software, wherein the optimizer generates a retargeted motion for the components by adjusting the defined motion, while retaining an overall speed of an optimized end effector trajectory for the robot provided in the defined motion, to suppress a portion of the vibrations predicted by the dynamic simulation, and
    wherein the optimizer generates the retargeted motion by minimizing differences between locations of a set of marker points on one or more of the rigid components in the defined motion and in the retargeted motion and by allowing vibrations in one or more of the flexible components disposed between the rigid components.

2. The system of claim 1, wherein the portion of the vibrations that is suppressed comprises only low-frequency, large-amplitude vibrations of one or more of the components of the robot.

3. The system of claim 1, wherein the ends of the flexible components are coupled to the rigid components using constraint-based, two-way coupling.

4. The system of claim 1, wherein the input animation includes a set of motor trajectories and wherein the optimizer modifies the set of motor trajectories to generate the retargeted motion for the components.

5. The system of claim 4, wherein the memory stores the set of marker points on the components of the robot are user selected and wherein the optimizer modifies the set of motor trajectories to retain trajectories of the user-selected marker points from the defined motion in the retargeted motion.

6. The system of claim 5, wherein the set of user-selected marker points are on rigid components of the robot.

7. The system of claim 1, wherein the minimizing of differences is adapted to allow a small amount of overshooting of target locations of the set of marker points to reduce global error regarding relative positioning of the set of marker points during the retargeted positioning.

8. The system of claim 1, wherein the generating of the retargeted motion comprises retaining orientations of the marker points as defined in the specified motion of the input animation.

9. The system of claim 1, wherein the generating of the retargeted motion includes retaining positions of a tracked set of the rigid components in global coordinates relative to the input animation.

10. The system of claim 1, further comprising a robot controller including the processor and wherein the robot controller generates a set of control signals for a physical implementation of the robot based on the retargeted motion generated by the optimizer.

11. The system of claim 1, wherein the flexible components are represented by the simulator using deformable bodies and the rigid components are represented by the simulator as rigid bodies.

12. The system of claim 11, wherein the flexible components are represented using an elastodynamics model.

13. A system for suppressing vibration in a robotic system, comprising:
    memory storing parameters of a target robotic system and an input motion for the target robotic system, wherein the input motion is defined by a set of motor trajectories defining movement of components of the robotic system;
    an optimizer modifying the set of motor trajectories to selectively suppress low-frequency vibrations of a plurality of the components of the robotic system during operations to perform a retargeted motion based on the input motion while an overall speed of an end effector center of mass (COM) trajectory of the robotic system; and
    a differential dynamics simulator generating a simulation of the input motion by modeling the target robotic system by representing flexible parts of the components with deformable bodies and stiff parts of the components with rigid bodies, wherein the optimizer modifies the set of motor trajectories based on the simulation.

14. The system of claim 13, wherein the modifying comprised determining a minimized quantity that is error in tracked marker points relative to the input motion integrated over time.

15. The system of claim 14, wherein the modifying comprises minimizing distances between simulated locations of points on one or more of the components and target location of the points in the input motion.

16. The system of claim 13, wherein the simulation is further generated by enforcing two-way coupling constraints between ends of the deformable bodies coupled to the rigid bodies.

17. The system of claim 16, wherein the simulation includes enforcing mechanical constraints between coupled pairs of the rigid bodies and wherein the enforcing of the mechanical constraints and the two-coupling constraints is performed using a unified constrained dynamics model.

18. A method of suppressing vibration in a robotic systems, comprising:
    receiving a set of input motions for a robot;
    simulating the robot operating based on the set of input motions by representing, during replaying of the set of input motions, flexible components of the robot as deformable bodies and rigid components of the robot as rigid bodies and by enforcing two-way coupling constraints between ends of the deformable bodies and the rigid bodies;
    based on the simulating, identifying vibrations of the components of the robot; and
    optimizing the set of input motions to generate a retargeted motion for the components of the robot that suppresses the low-frequency vibrations,
    wherein the optimizing generates the retargeted motion by minimizing differences between locations and orientations of a set of marker points on one or more of the rigid components in the set of input motions and in the retargeted motion.

19. The method of claim 18, wherein the optimizing comprises performing a space-time optimization on motor controls defined by the set of input motions using a continuous adjoint method.

20. The method of claim 18, wherein the simulating comprises discretizing the deformable bodies with finite elements and simulating the dynamic behavior of the deformable bodies while replaying the set of input motions.

21. The method of claim 18, wherein the optimizing comprises comparing differences between trajectories for a set of user-selected points on the rigid components during the replaying of the set of input motions and target trajectories for the set of user-selected points defined by the set of input motions and further comprises optimizing, based on the comparing, motion profiles of motors of the robot to reduce visible vibrations in the robot.

22. The method of claim 18, wherein the optimizing further includes generating the retargeted motion by both locally slowing down and locally speeding up a motor control profile.

23. The method of claim 18, wherein the optimizing further includes generating the retargeted motion by smoothing out transitions to poses.

24. The method of claim 23, wherein the optimizing includes generating the retargeted motions by preempting one or more motions and adding deformations ahead of the one or more motions to cancel oscillations.

* * * * *